(12) United States Patent
Ibrahim et al.

(10) Patent No.: US 12,335,177 B2
(45) Date of Patent: Jun. 17, 2025

(54) SYSTEMS AND METHODS FOR MANAGING UPLINK TRANSMISSION AND CROSSLINK INTERFERENCE MEASUREMENT

(71) Applicant: QUALCOMM Incorporated, San Diego, CA (US)

(72) Inventors: Abdelrahman Mohamed Ahmed Mohamed Ibrahim, San Diego, CA (US); Muhammad Sayed Khairy Abdelghaffar, San Jose, CA (US); Huilin Xu, Temecula, CA (US); Seyedkianoush Hosseini, San Diego, CA (US); Ahmed Attia Abotabl, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 559 days.

(21) Appl. No.: 17/710,402

(22) Filed: Mar. 31, 2022

(65) Prior Publication Data
US 2023/0318767 A1    Oct. 5, 2023

(51) Int. Cl.
*H04L 5/00* (2006.01)
*H04W 72/1263* (2023.01)
*H04W 72/566* (2023.01)

(52) U.S. Cl.
CPC ....... *H04L 5/0048* (2013.01); *H04W 72/1263* (2013.01); *H04W 72/566* (2023.01)

(58) Field of Classification Search
None
See application file for complete search history.

(56) References Cited

U.S. PATENT DOCUMENTS

| 2007/0258540 | A1* | 11/2007 | Ratasuk | H04L 5/0091 |
| | | | | 375/267 |
| 2018/0323916 | A1* | 11/2018 | Yang | H04L 5/0053 |
| 2022/0060265 | A1 | 2/2022 | Xu et al. | |
| 2022/0159662 | A1* | 5/2022 | Li | H04L 5/0051 |
| 2023/0088283 | A1* | 3/2023 | Lee | H04W 56/001 |
| | | | | 370/503 |
| 2024/0114489 | A1* | 4/2024 | Liu | H04W 74/0833 |

FOREIGN PATENT DOCUMENTS

EP    3823397 A1 * 5/2021 ........ H04W 72/1242

OTHER PUBLICATIONS

ERICSSON: "Remaining Issues for CLI Measurement and Reporting", 3GPP TSG RAN WG1 Meeting 96, R1-1903032, 3GPP, Mobile Competence Centre, 650, Route Des Lucioles, F-06921, Sophia-Antipolis, Cede, vol. RAN WG1, No. Athens, Greece, Feb. 25, 2019-Mar. 1, 2019 Feb. 15, 2019, pp. 1-7, XP051600729, Sec.2, Figure 1, p. sec. 1.
International Search Report and Written Opinion—PCT/US2023/011685—ISA/EPO—May 15, 2023.

* cited by examiner

*Primary Examiner* — Jamaal Henson
(74) *Attorney, Agent, or Firm* — Haynes and Boone, LLP

(57) ABSTRACT

A method of wireless communication performed by a user equipment (UE) includes: receiving a cell configuration associated with a cross-link interference sounding reference signal (CLI-SRS) timing; and transmitting, based on the CLI-SRS timing and a CLI-SRS priority configuration, a first communication at a first time period. A second communication may be scheduled for at least a portion of the first time period, and one of the first communication or the second communication may include a CLI-SRS.

28 Claims, 18 Drawing Sheets

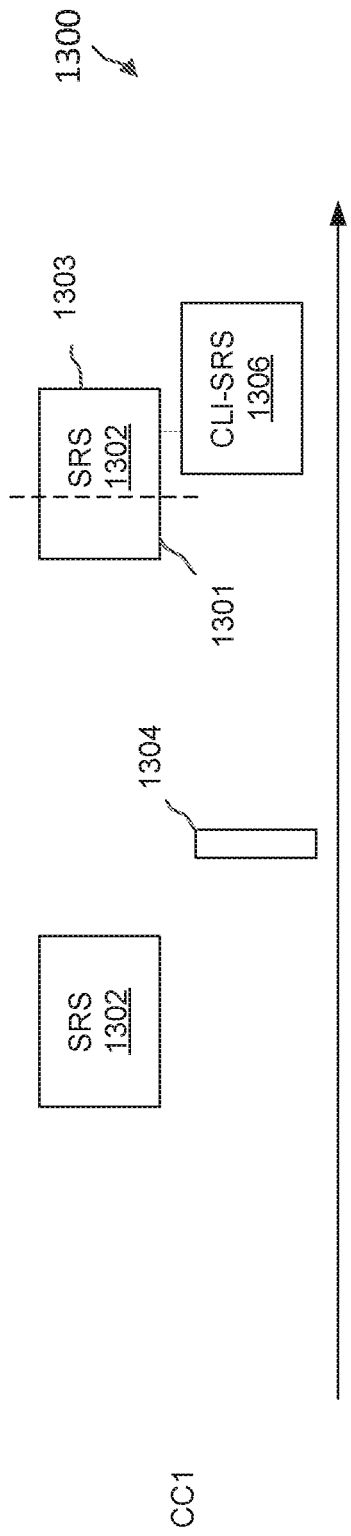

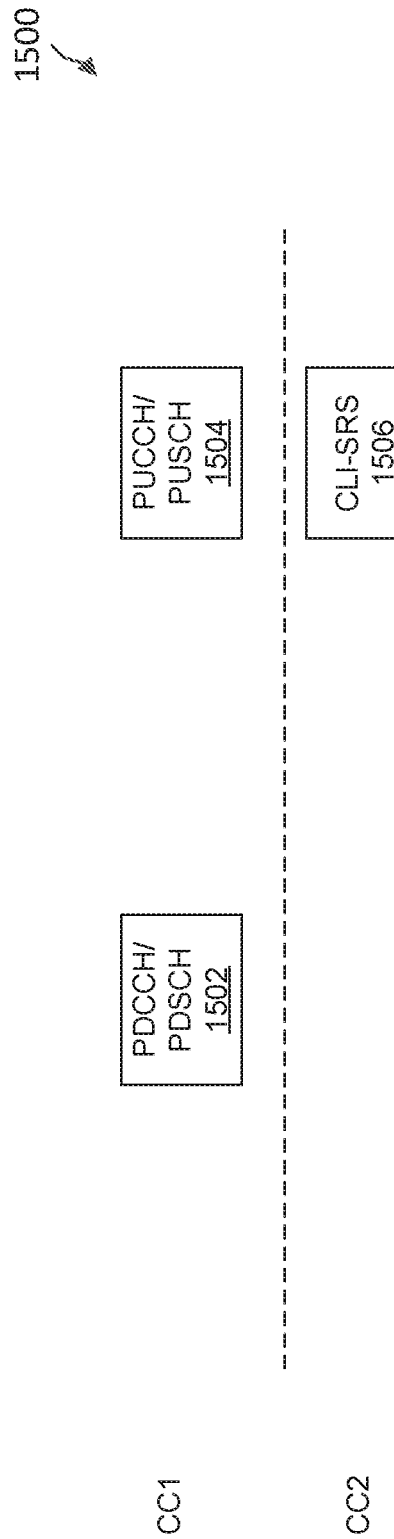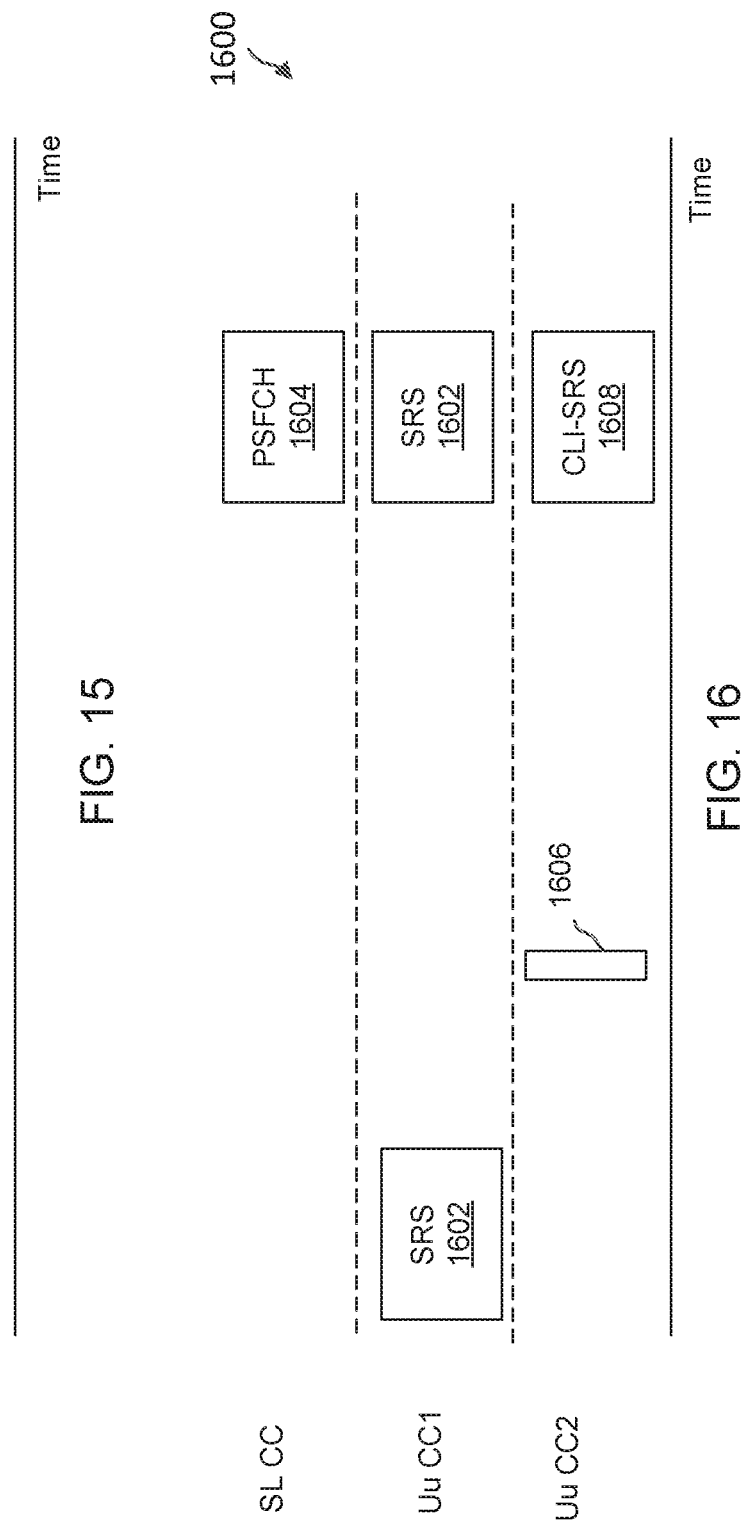

SYSTEMS AND METHODS FOR MANAGING UPLINK TRANSMISSION AND CROSSLINK INTERFERENCE MEASUREMENT

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the long term evolution (LTE) technology to a next generation new radio (NR) technology, which may be referred to as $5^{th}$ Generation (5G). For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as mmWave bands.

Wireless communication devices may experience one or more types of interference from devices within their own cell and/or devices associated with other cells. Interference may be more likely when a device is using a full duplex communication mode, such as sub-band full duplex mode, or in-band full duplex mode. In some aspects, sub-band full duplex mode may be referred to as half-duplex mode. In another aspect, in-band full duplex mode may be referred to as same-band full duplex (SBFD) mode. For example, a wireless communication device operating in SBFD mode may experience crosslink interference (CLI) from other wireless communication devices based on signal energy leakage in an SBFD frame. CLI may refer to interference from one UE to another nearby UE, for example. When an aggressor UE is transmitting to a base station, a victim UE may receive this transmission as interference in its DL symbols if the aggressor's UL symbol collides with at least one DL symbol of the victim UE. CLI can occur between two UEs on the same cell or on different cells.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

According to one aspect of the present disclosure, a method of wireless communication performed by a user equipment (UE) includes: receiving a cell configuration associated with a cross-link interference sounding reference signal (CLI-SRS) timing; and transmitting, based on the CLI-SRS timing and a CLI-SRS priority configuration, a first communication at a first time period, wherein a second communication is scheduled for at least a portion of the first time period, and wherein one of the first communication or the second communication comprises a CLI-SRS.

According to another aspect of the present disclosure, a user equipment (UE) includes: a processor; and a transceiver in communication with the processor, wherein the UE is configured to: receive a cell configuration associated with a cross-link interference sounding reference signal (CLI-SRS) timing; and transmit, based on the CLI-SRS timing and a CLI-SRS priority configuration, a first communication at a first time period, wherein a second communication is scheduled for at least a portion of the first time period, and wherein one of the first communication or the second communication comprises a CLI-SRS.

According to another aspect of the present disclosure, a non-transitory, computer-readable medium has program code recorded thereon, wherein the program code comprises instructions executable by a processor of a user equipment (UE) to cause the UE to: receive a cell configuration associated with a cross-link interference sounding reference signal (CLI-SRS) timing; and transmit, based on the CLI-SRS timing and a CLI-SRS priority configuration, a first communication at a first time period, wherein a second communication is scheduled for at least a portion of the first time period, and wherein one of the first communication or the second communication comprises a CLI-SRS.

According to another aspect of the present disclosure, a UE includes: means for receiving a cell configuration associated with a cross-link interference sounding reference signal (CLI-SRS) timing; and means for transmitting, based on the CLI-SRS timing and a CLI-SRS priority configuration, a first communication at a first time period, wherein a second communication is scheduled for at least a portion of the first time period, and wherein one of the first communication or the second communication comprises a CLI-SRS.

Other aspects, features, and embodiments of the present disclosure will become apparent to those of ordinary skill in the art, upon reviewing the following description of specific, exemplary embodiments of the present disclosure in conjunction with the accompanying figures. While features of the present disclosure may be discussed relative to certain embodiments and figures below, all embodiments of the present disclosure can include one or more of the advantageous features discussed herein. In other words, while one or more embodiments may be discussed as having certain advantageous features, one or more of such features may also be used in accordance with the various embodiments of the disclosure discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

FIG. 13 is a timing diagram of colliding UL communications, according to some aspects of the present disclosure.

FIG. 14 is a timing diagram of colliding UL and SL communications, according to some aspects of the present disclosure.

FIG. 15 is a timing diagram of colliding UL communications, according to some aspects of the present disclosure.

FIG. 16 is a timing diagram of colliding UL and SL communications on different CCs, according to some aspects of the present disclosure.

DETAILED DESCRIPTION

Figure 1A:
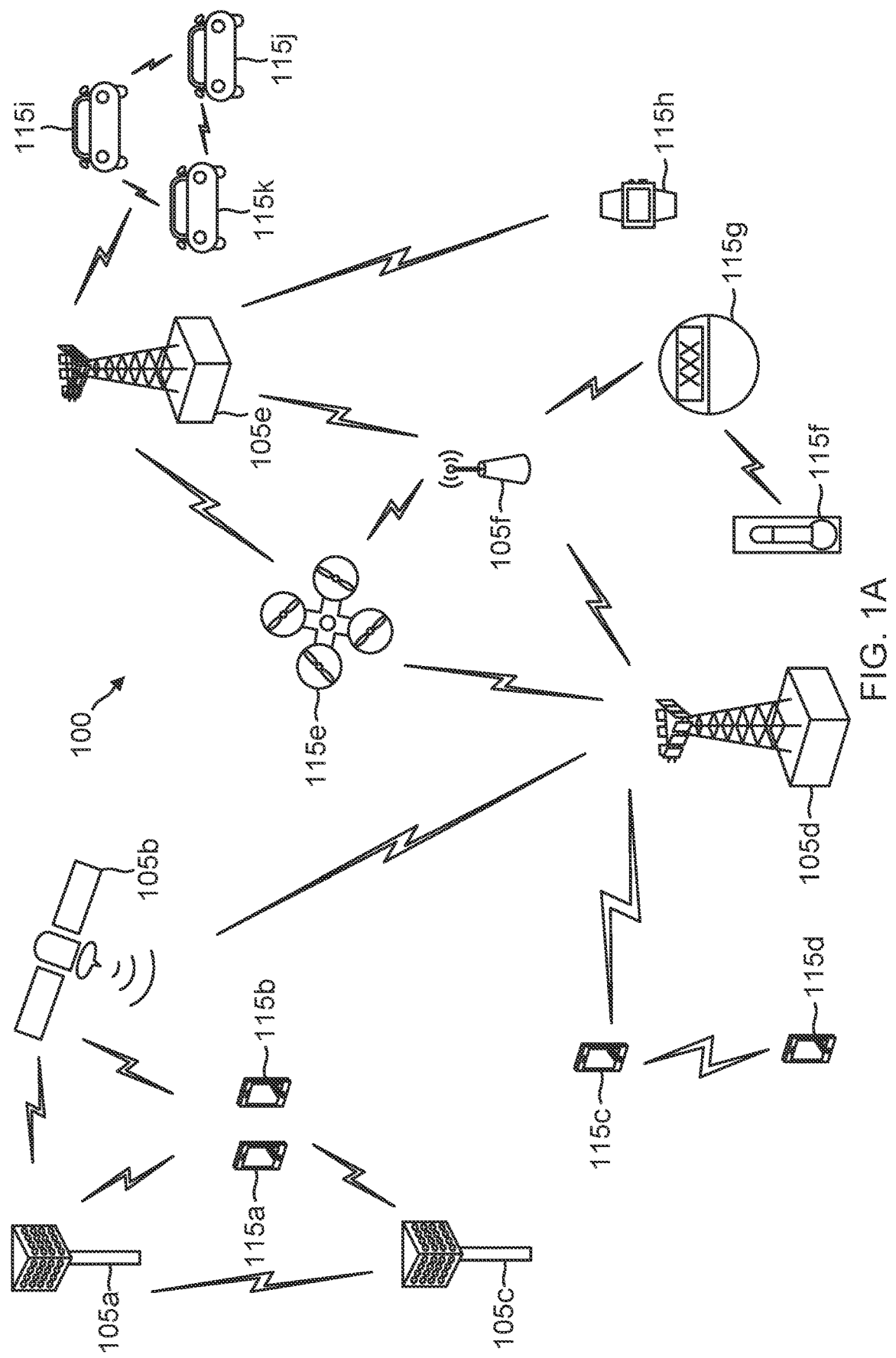
FIG. 1A illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, $5^{th}$ Generation (5G) or new radio (NR) networks, as well as other communications networks. As described herein, the terms "networks" and "systems" may be used interchangeably.

An ODFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "$3^{rd}$ Generation Partnership Project" (3GPP), and cdma2000 is described in documents from an organization named "$3^{rd}$ Generation Partnership Project 2" (3GPP2). These various radio technologies and standards are known or are being developed. For example, the $3^{rd}$ Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with a Ultra-high density (e.g., ~1M nodes/km$^2$), ultra-low complexity (e.g., ~10s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (BUD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing (SCS) may occur with 15 kHz, for example over 5, 10, 20 MHz, and the like bandwidth (BW). For other various outdoor and small cell coverage deployments of TDD greater than 3 GHz, subcarrier spacing may occur with 30 kHz over a 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs may allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink (UL) and downlink (DL) to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

As mentioned above, a wireless communication device operating in SBFD mode may experience crosslink interference (CLI) from other wireless communication devices based on signal energy leakage in an SBFD frame. To account for CLI, wireless communication devices, including UEs, may be configured with CLI measurement resources to measure potential CLI and transmit a CLI report to the base station. UEs measuring or experiencing CLI may be referred to as victim UEs. According to an aspect of the present disclosure, one or more UEs in the network may be configured with transmission resources to transmit one or more reference signals to facilitate the measurement of CLI by other UEs during CLI measurement windows. The UEs causing the CLI interference or transmitting the CLI reference signals may be referred to as aggressor UEs. In some aspects, the aggressor UEs may be configured to transmit one or more SRS communications to facilitate the CLI measurements. For the purposes of the present disclosure, these SRS signals may be referred to as CLI-SRS.

In some aspects, the SRS for CLI may have a similar or identical format and structure as non-CLI SRS. In other aspects, the CLI-SRS may have a structure or format that is different from non-CLI SRS in at least one aspect. In another aspect, the CLI-SRS may be a cell-level configuration such that the CLI-SRS resources may be aligned for different UEs communicating in a network. In some aspects, the cell configuration, which may also be referred to as a component carrier (CC) configuration and/or a bandwidth part (BWP) configuration, may indicate one or more parameters for the CLI-SRS. Further, the victim UEs may be configured with cell-level CLI measurement resources. For example, one or more of the UEs operating in the cell using a full duplex mode may be configured with a zero power (ZP) CLI-SRS measurement resource. Accordingly, in some aspects, both the CLI-SRS transmission resources and the CLI-SRS measurement resources may be cell-level resources based on or associated with one or more cell configurations.

CLI-SRS resources may include periodic, semi-persistent, and/or aperiodic resources. For example, the CLI-SRS resources may be periodic and configured for transmission without receiving an activation. In other aspects, the CLI-SRS resources may be semi-persistent, such that the periodicity and resources are known and are triggered by an activation. In some aspects, receiving an activation may include receiving a media access control control element (MAC-CE) indicating the CLI-SRS resource activation. In another aspect, receiving the activation may include receiving a DCI activating one or more aperiodic CLI-SRS resources.

As similarly described above with respect to CLI measurements, there may be a collision or scheduling conflict between a CLI-SRS and a UL transmission. For instance, a UE may be configured with a periodic SRS that collides with at least one occasion of a semi-persistent or aperiodic CLI-SRS. In some aspects, the UE may not be expected to handle a collision between at least some UL transmissions and/or SL transmission (e.g., PUCCH, PSFCH) and CLI-SRS.

The present disclosure describes schemes and mechanisms for handling and/or avoiding scheduling collisions of a CLI-SRS and at least one other UL and/or SL communication scheduled for transmission. Further aspects of the present disclosure describe power allocation rules and configurations for transmitting CLI-SRS concurrently with one or more other UL/SL communications on different carriers in carrier aggregation (CA) mode. Aspects of present disclosure apply to Uu communications as well as SL communications. Uu communications may include communications on a Uu interface between a UE and a radio access network (RAN). For example, Uu communications may include communications between a UE and a network device or entity. In some aspects, the Uu communications may be between a UE and a BS in a wireless communication network. The Uu interface may be referred to as an air interface. For example, Uu communications include UL and DL communications between one or more UEs and one or more BSs. In some aspects, Uu communications may be communicated on a physical downlink control channel (PDCCH), a physical downlink shared channel (PDSCH), a physical uplink control channel (PUCCH), a physical uplink shared channel (PUSCH), a physical broadcast channel (PBCH), and/or any other UE-BS communication channel Uu communications may include control information, data, and/or reference signals. SL communications may include communications between multiple UEs. SL communications may be communicated directly to other UEs without being routed through a RAN or network entity. In some aspects, an SL interface may be referred to as a PC5 interface. SL communications may be communicated on a physical sidelink control channel (PSCCH), a physical sidelink shared channel (PSSCH), a physical sidelink feedback channel (PSFCH), and/or any other SL communication channel.

CLI-SRS priority configurations may be used to resolve collisions or conflicts between multiple Uu communications, between multiple SL communications, and/or between Uu and SL communications. Further, CLI-SRS power allocation priority configurations may be used to allocate or distribute power between multiple Uu communications, between multiple SL communications, and/or between Uu and SL communications.

The methods, mechanisms, and other aspects of the present disclosure provide several advantages. For example, the CLI-SRS prioritization schemes described herein provide for the communication of CLI-SRS signals to facilitate CLI measurements in the event of a scheduling collision of a lower-priority signal. In this regard, it may be desirable or more efficient to transmit a CLI-SRS instead of a colliding UL/SL communication, but not in others. In some instances, another type of communication may take priority over CLI-SRS. Further, by making the CLI configurations cell-level configurations, there may be less network management overhead, as the CLI-SRS transmission and/or measurement resources may be aligned for different UEs operating in the cell. Further, cell-level CLI-SRS resources and configurations may be used on both Uu and SL communications. Accordingly, separate Uu/SL configurations may not be necessary. By establishing priority of transmission and power allocation for CLI-SRS relative to other signals, the network may ensure that CLI-SRS measurements do not lead to the delay of higher priority communications, but that CLI-SRS communications may proceed even if there would be a collision with lower-priority UL/SL communications. Accordingly, undesirable delays, latency, and network overhead may be reduced, and network efficiency and user experience may be improved.

FIG. 1A illustrates a wireless communication network 100 according to some aspects of the present disclosure. The network 100 may be a 5G network. The network 100 includes a number of network devices and/or network entities, including base stations (BSs) 105 (individually labeled as 105a, 105b, 105c, 105d, 105e, and 105f) and other network devices or network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used. The actions of FIGS. 7-10 may be performed by any of BSs 105 and/or any of the UEs 115. The devices of the network 100 may be configured to communicate using one or more interfaces, including a Uu interface or air interface, and a sidelink (SL) interface. In some aspects, the SL interface may be referred to as a PC5 interface.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1A, the BSs 105b, 105d, and 105e may be regular macro BSs, while the BSs 105a and 105c may be macro BSs enabled with one of three dimension (3D), full dimension (PD), or massive MIMO. The BSs 105a and 105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115h are examples of various machines configured for communication that access the network 100. The UEs 115i-115k are examples of vehicles equipped with wireless communication devices configured for communication that access the network 100. A UE 115 may be able to communicate with any type of the BSs, whether macro BS, small cell, or the like. In FIG. 1A, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

Now returning to FIG. 1, in operation, the BSs 105a and 105c may serve the UEs 115a and 115b using 3D beamforming and coordinated spatial techniques, such as coordinated multipoint (CoMP) or multi-connectivity. The macro BS 105d may perform backhaul communications with the BSs 105a and 105c, as well as small cell, the BS 105f. The macro BS 105d may also transmit multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-step-size configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as vehicle-to-vehicle (V2V), vehicle-to-everything (V2X), cellular-V2X (C-V2X) communications between a UE 115i, 115j, or 115k and other UEs 115, and/or vehicle-to-infrastructure (V2I) communications between a UE 115i, 115j, or 115k and a BS 105. Additionally, BS 105b is shown as a non-terrestrial network (NTN) resource, such as a satellite that orbits the earth. In this example, BS 105b may include multiple antenna arrays, each array forming a relatively fixed beam. BS 105b may be configured as a single cell with multiple beams and BWPs, as explained in more detail below.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In some aspects, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information—reference signals (CSI-RSs) to enable a UE 115 to estimate a DL channel. Similarly, a UE 115 may transmit sounding reference signals (SRSs) to enable a BS 105 to estimate a UL channel Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some instances, the BSs 105 may broadcast the PSS, the SSS, and/or the MIB in the form of synchronization signal blocks (SSBs) over a physical broadcast channel (PBCH) and may broadcast the RMSI and/or the OSI over a physical downlink shared channel (PDSCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PUSCH), power control, and SRS.

After obtaining the MIB, the RMSI and/or the OSI, the UE 115 can perform a random access procedure to establish a connection with the BS 105. In some examples, the random access procedure may be a four-step random access procedure. For example, the UE 115 may transmit a random access preamble and the BS 105 may respond with a random access response. The random access response (RAR) may include a detected random access preamble identifier (ID) corresponding to the random access preamble, timing advance (TA) information, a UL grant, a temporary cell-radio network temporary identifier (C-RNTI), and/or a back-off indicator. Upon receiving the random access response, the UE 115 may transmit a connection request to the BS 105 and the BS 105 may respond with a connection response. The connection response may indicate a contention resolution. In some examples, the random access preamble, the RAR, the connection request, and the connection response can be referred to as message 1 (MSG1), message 2 (MSG2), message 3 (MSG3), and message 4 (MSG4), respectively. In some examples, the random access procedure may be a two-step random access procedure, where the UE 115 may transmit a random access preamble and a connection request in a single transmission and the BS 105 may respond by transmitting a random access response and a connection response in a single transmission.

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The scheduling grants may be transmitted in the form of DL control information (DCI). The BS 105 may transmit a DL communication signal (e.g., carrying data) to the UE 115 via a PDSCH according to a DL scheduling grant. The UE 115 may transmit a UL communication signal to the BS 105 via a PUSCH and/or PUCCH according to a UL scheduling grant.

In some aspects, the BS 105 may communicate with a UE 115 using hybrid automatic repeat request (HARQ) techniques to improve communication reliability, for example, to provide an ultra-reliable low-latency communication (URLLC) service. The BS 105 may schedule a UE 115 for a PDSCH communication by transmitting a DL grant in a PDCCH. The BS 105 may transmit a DL data packet to the UE 115 according to the schedule in the PDSCH. The DL data packet may be transmitted in the form of a transport block (TB). If the UE 115 receives the DL data packet successfully, the UE 115 may transmit a HARQ acknowledgement (ACK) to the BS 105.

Conversely, if the UE 115 fails to receive the DL transmission successfully, the UE 115 may transmit a HARQ negative-acknowledgement (NACK) to the BS 105. Upon receiving a HARQ NACK from the UE 115, the BS 105 may retransmit the DL data packet to the UE 115. The retransmission may include the same coded version of DL data as the initial transmission. Alternatively, the retransmission may include a different coded version of the DL data than the initial transmission. The UE 115 may apply soft-combining to combine the encoded data received from the initial transmission and the retransmission for decoding. The BS 105 and the UE 115 may also apply HARQ for UL communications using substantially similar mechanisms as the DL HARQ.

In some aspects, the network 100 may operate over a system BW or a component carrier (CC) BW. The network 100 may partition the system BW into multiple bandwidth parts (BWPs) (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some aspects, a BS 105 may assign a pair of BWPs within the CC to a UE 115 for UL and DL communications. For example, the BWP pair may include one BWP for UL communications and one BWP for DL communications.

In some aspects, the network 100 may operate over a shared channel, which may include shared frequency bands or unlicensed frequency bands. For example, the network 100 may be an NR-unlicensed (NR-U) network. The BSs 105 and the UEs 115 may be operated by multiple network operating entities. To avoid collisions, the BSs 105 and the UEs 115 may employ a listen-before-talk (LBT) procedure to monitor for transmission opportunities (TXOPs) in the shared channel. For example, a transmitting node (e.g., a BS 105 or a UE 115) may perform an LBT prior to transmitting in the channel. When the LBT passes, the transmitting node may proceed with the transmission. When the LBT fails, the transmitting node may refrain from transmitting in the channel. In an example, the LBT may be based on energy detection. For example, the LBT results in a pass when signal energy measured from the channel is below a threshold. Conversely, the LBT results in a failure when signal energy measured from the channel exceeds the threshold. In another example, the LBT may be based on signal detection. For example, the LBT results in a pass when a channel reservation signal (e.g., a predetermined preamble signal) is not detected in the channel.

In some aspects, the network 100 may operate over a high frequency band, for example, in a frequency range 1 (FR1) band or a frequency range 2 (FR2) band. FR1 may refer to frequencies in the sub-6 GHz range and FR2 may refer to frequencies in the mmWave range. To overcome the high path-loss at high frequency, the BSs 105 and the UEs 115 may communicate with each other using directional beams. For instance, a BS 105 may transmit SSBs by sweeping across a set of predefined beam directions and may repeat the SSB transmissions at a certain time interval in the set of beam directions to allow a UE 115 to perform initial network access. In the example of NTN resource 105b, it may transmit SSBs on each of its beams at scheduled times, even if the beams do not steer. In some instances, each beam and its corresponding characteristics may be identified by a beam index. For instance, each SSB may include an indication of a beam index corresponding to the beam used for the SSB transmission.

The UE 115 may determine signal measurements, such as reference signal received power (RSRP) and/or reference signal received quality (RSRQ), for the SSBs at the different beam directions and select a best DL beam. The UE 115 may indicate the selection by transmitting a physical random access channel (PRACH) signal (e.g., MSG1) using PRACH resources associated with the selected beam direction. For instance, the SSB transmitted in a particular beam direction or on a particular beam may indicate PRACH resources that may be used by a UE 115 to communicate with the BS 105 in that particular beam direction. After selecting the best DL beam, the UE 115 may complete the random access procedure (e.g., the 4-step random access or the 2-step random access) and proceed with network registration and normal operation data exchange with the BS 105. In some instances, the initially selected beams may not be optimal or the channel condition may change, and thus the BS 105 and the UE 115 may perform a beam refinement procedure to refine a beam selection. For instance, BS 105 may transmit CSI-RSs by sweeping narrower beams over a narrower angular range and the UE 115 may report the best DL beam to the BS 105. When the BS 105 uses a narrower beam for transmission, the BS 105 may apply a higher gain, and thus may provide a better performance (e.g., a higher signal-noise-ratio (SNR)). In some instances, the channel condition may degrade and/or the UE 115 may move out of a coverage of an initially selected beam, and thus the UE 115 may detect a beam failure condition. Upon detecting a beam failure, the UE 115 may perform beam handover.

In some aspects, the network 100 may be an IoT network and the UEs 115 may be IoT nodes, such as smart printers, monitors, gaming nodes, cameras, audio-video (AV) production equipment, industrial IoT devices, and/or the like. The transmission payload data size of an IoT node typically may be relatively small, for example, in the order of tens of bytes. In some aspects, the network 100 may be a massive IoT network serving tens of thousands of nodes (e.g., UEs 115) over a high frequency band, such as a FR1 band or a FR2 band.

Figure 1B:
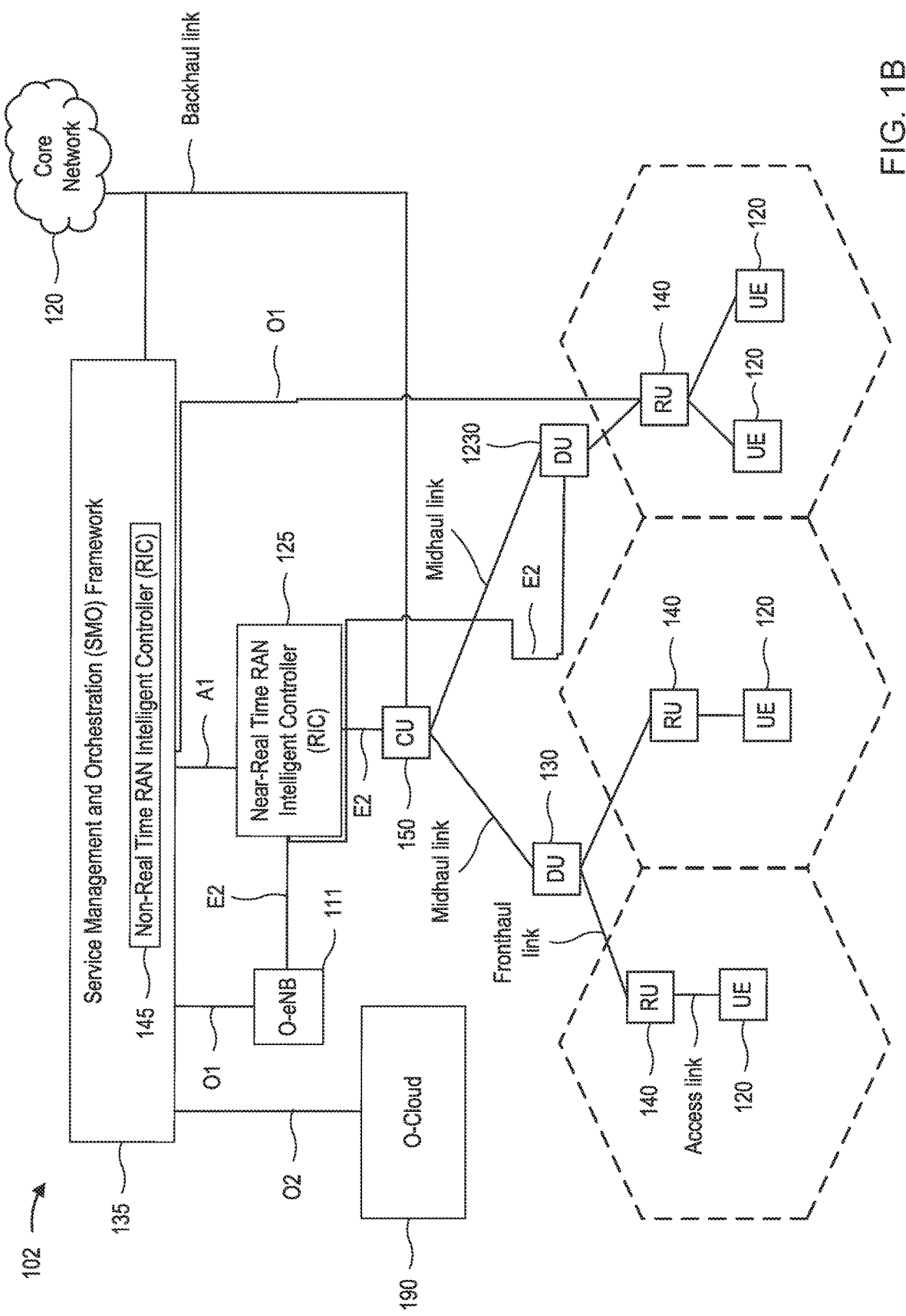
FIG. 1B is a diagram illustrating an example disaggregated BS architecture according to some aspects of the present disclosure.

FIG. 1B shows a diagram illustrating an example disaggregated base station 102 architecture. The disaggregated base station 102 architecture may include one or more central units (CUs) 150 that can communicate directly with a core network 120 via a backhaul link, or indirectly with the core network 100 through one or more disaggregated base station units (such as a Near-Real Time (Near-RT) RAN Intelligent Controller (RIC) 125 via an E2 link, or a Non-Real Time (Non-RT) RIC 145 associated with a Service Management and Orchestration (SMO) Framework 135, or both). A CU 150 may communicate with one or more distributed units (DUs) 130 via respective midhaul links, such as an F1 interface. The DUs 130 may communicate with one or more radio units (RUs) 140 via respective fronthaul links. The RUs 140 may communicate with respective UEs 120 via one or more radio frequency (RF) access links. In some implementations, the UE 120 may be simultaneously served by multiple RUs 140.

Each of the units, i.e., the CUs 150, the DUs 130, the RUs 140, as well as the Near-RT RICs 125, the Non-RT RICs 145 and the SMO Framework 135, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 150 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 150. The CU 150 may be configured to handle user plane functionality (i.e., Central Unit—User Plane (CU-UP)), control plane functionality (i.e., Central Unit—Control Plane (CU-CP)), or a combination thereof. In some implementations, the CU 150 can be logically split into one or more CU-UP units and one or more CU-CP units. The CU-UP unit can communicate bidirectionally with the CU-CP unit via an interface, such as the E1 interface when implemented in an O-RAN configuration. The CU 150 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the $3^{rd}$ Generation Partnership Project (3GPP). In some aspects, the DU 130 may further host one or more low PHY layers. Each layer (or module) can be implemented with an interface configured to communicate signals with other layers (and modules) hosted by the DU 130, or with the control functions hosted by the CU 150.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 120. In some implementations, real-time and non-real-time aspects of control and user plane communication with the RU(s) 140 can be controlled by the corresponding DU 130. In some scenarios, this configuration can enable the DU(s) 130 and the CU 150 to be implemented in a cloud-based RAN architecture, such as a vRAN architecture.

The SMO Framework 135 may be configured to support RAN deployment and provisioning of non-virtualized and virtualized network elements. For non-virtualized network elements, the SMO Framework 135 may be configured to support the deployment of dedicated physical resources for RAN coverage requirements which may be managed via an operations and maintenance interface (such as an O1 interface). For virtualized network elements, the SMO Framework 135 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 150, DUs 130, RUs 140 and Near-RT RICs 125. In some implementations, the SMO Framework 135 can communicate with a hardware aspect of a 4G RAN, such as an open eNB (O-eNB) 111, via an O1 interface. Additionally, in some implementations, the SMO Framework 135 can communicate directly with one or more RUs 140 via an O1 interface. The SMO Framework 135 also may include a Non-RT RIC 145 configured to support functionality of the SMO Framework 135.

The Non-RT RIC 145 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 125. The Non-RT RIC 145 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 150, one or more DUs 130, or both, as well as an O-eNB, with the Near-RT RIC 125.

In some implementations, to generate A1/ML models to be deployed in the Near-RT RIC 125, the Non-RT RIC 145 may receive parameters or e14ternal enrichment information from external servers. Such information may be utilized by the Near-RT RIC 125 and may be received at the SMO Framework 135 or the Non-RT RIC 145 from non-network data sources or from network functions. In some examples, the Non-RT RIC 145 or the Near-RT RIC 125 may be configured to tune RAN behavior or performance. For e14ample, the Non-RT RIC 145 may monitor long-term trends and patterns for performance and employ AI/ML models to perform corrective actions through the SMO Framework 135 (such as reconfiguration via 01) or via creation of RAN management policies (such as A1 policies).

Figure 2:
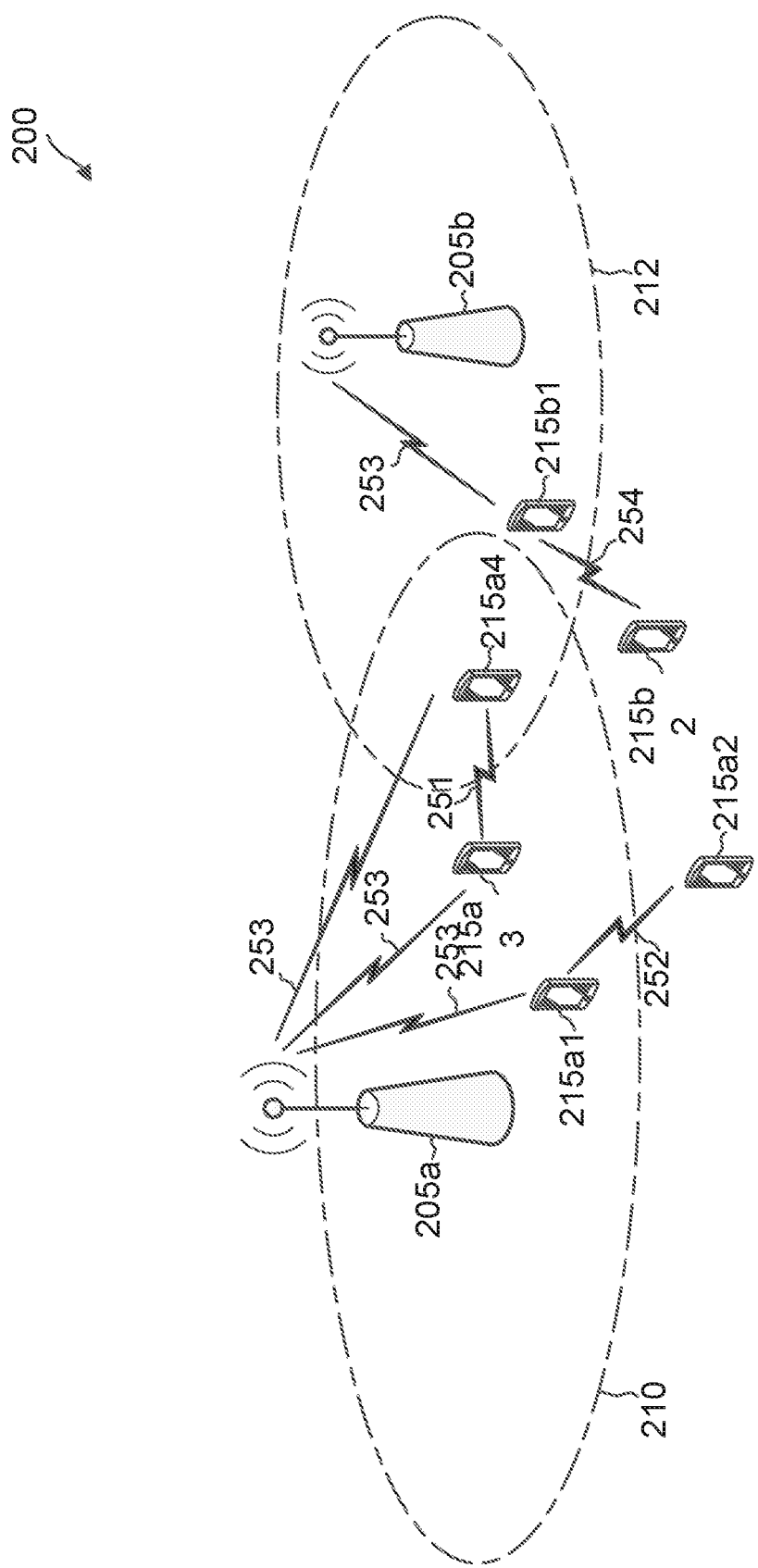
FIG. 2 illustrates a sidelink communication network according to some aspects of the present disclosure.

FIG. 2 illustrates an example of a wireless communication network 200 that provisions for sidelink communications according to aspects of the present disclosure. The network 200 may correspond to a portion of the network 100. FIG. 2 illustrates two BSs 205 (shown as 205*a* and 205*b*) and six UEs 215 (shown as 215*a*1, 215*a*2, 215*a*3, 215*a*4, 215*b*1, and 215*b*2) for purposes of simplicity of discussion, though it will be recognized that aspects of the present disclosure may scale to any suitable number of UEs 215 (e.g., the about 2, 3, 4, 5, 7 or more) and/or BSs 205 (e.g., the about 1, 3 or more). The BS 205 and the UEs 215 may be similar to the BSs 105 and the UEs 115, respectively. The BSs 205 and the UEs 215 may share the same radio frequency band for communications. In some instances, the radio frequency band may be a 2.4 GHz unlicensed band, a 5 GHz unlicensed band, or a 6 GHz unlicensed band. In general, the shared radio frequency band may be at any suitable frequency.

The BS 205*a* and the UEs 215*a*1-215*a*4 may be operated by a first network operating entity. The BS 205*b* and the UEs 215*b*1-215*b*2 may be operated by a second network operating entity. In some aspects, the first network operating entity may utilize a same RAT as the second network operating entity. For instance, the BS 205*a* and the UEs 215*a*1-215*a*4 of the first network operating entity and the BS 205*b* and the UEs 215*b*1-215*b*2 of the second network operating entity are NR-U devices. In some other aspects, the first network operating entity may utilize a different RAT than the second network operating entity. For instance, the BS 205*a* and the UEs 215*a*1-215*a*4 of the first network operating entity may utilize NR-U technology while the BS 205*b* and the UEs 215*b*1-215*b*2 of the second network operating entity may utilize WiFi or LAA technology.

In the network 200, some of the UEs 215*a*1-215*a*4 may communicate with each other in peer-to-peer communications. For example, the UE 215*a*1 may communicate with the UE 215*a*2 over a sidelink 252, the UE 215*a*3 may communicate with the UE 215*a*4 over another sidelink 251, and the UE 215*b*1 may communicate with the UE 215*b*2 over yet another sidelink 254. The sidelinks 251, 252, and 254 are unicast bidirectional links. Some of the UEs 215 may also communicate with the BS 205*a* or the BS 205*b* in a UL direction and/or a DL direction via communication links 253. For instance, the UE 215*a*1, 215*a*3, and 215*a*4 are within a coverage area 210 of the BS 205*a*, and thus may be in communication with the BS 205*a*. The UE 215*a*2 is outside the coverage area 210, and thus may not be in direct communication with the BS 205*a*. In some instances, the UE 215*a*1 may operate as a relay for the UE 215*a*2 to reach the BS 205*a*. Similarly, the UE 215*b*1 is within a coverage area 212 of the BS 205*b*, and thus may be in communication with the BS 205*b* and may operate as a relay for the UE 215*b*2 to reach the BS 205*b*. In some aspects, some of the UEs 215 are associated with vehicles (e.g., similar to the UEs 115*i-k*) and the communications over the sidelinks 251, 252, and 254 may be C-V2X communications. C-V2X communications may refer to communications between vehicles and any other wireless communication devices in a cellular network.

Figure 3:
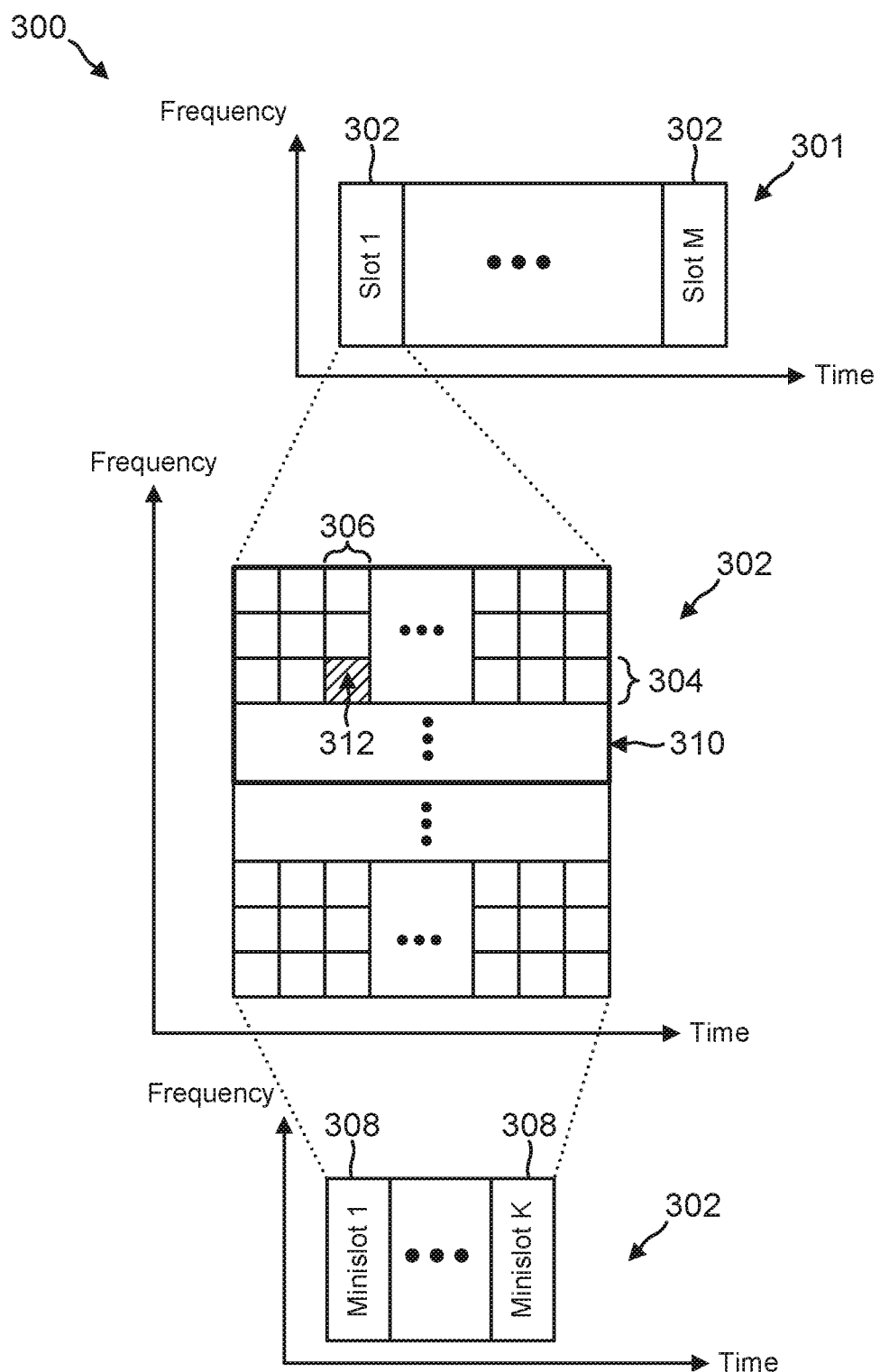
FIG. 3 illustrates a radio frame structure according to some aspects of the present disclosure.

FIG. 3 is a timing diagram illustrating a radio frame structure 300 according to some aspects of the present disclosure. The radio frame structure 300 may be employed by BSs such as the BSs 105 and UEs such as the UEs 115 in a network such as the network 100 for communications. In particular, the BS may communicate with the UE using time-frequency resources configured as shown in the radio frame structure 300. In FIG. 3, the x-axes represent time in some arbitrary units and the y-axes represent frequency in some arbitrary units. The transmission frame structure 300 includes a radio frame 301. The duration of the radio frame 301 may vary depending on the aspects. In an example, the radio frame 301 may have a duration of about ten milliseconds. The radio frame 301 includes M number of slots 302, where M may be any suitable positive integer. In an example, M may be about 10.

Each slot 302 includes a number of subcarriers 304 in frequency and a number of symbols 306 in time. The number of subcarriers 304 and/or the number of symbols 306 in a slot 302 may vary depending on the aspects, for example, based on the channel bandwidth, the subcarrier spacing (SCS), and/or the cyclic prefix (CP). One subcarrier 304 in frequency and one symbol 306 in time forms one resource element (RE) 312 for transmission. A resource block (RB) 310 is formed from a number of consecutive subcarriers 304 in frequency and a number of consecutive symbols 306 in time.

In an example, a BS (e.g., BS 105 in FIG. 1A) may schedule a UE (e.g., UE 115 in FIG. 1A) for UL and/or DL communications at a time-granularity of slots 302 or mini-slots 308. Each slot 302 may be time-partitioned into K number of mini-slots 308. Each mini-slot 308 may include one or more symbols 306. The mini-slots 308 in a slot 302 may have variable lengths. For example, when a slot 302 includes N number of symbols 306, a mini-slot 308 may have a length between one symbol 306 and (N−1) symbols 306. In some aspects, a mini-slot 308 may have a length of about two symbols 306, about four symbols 306, or about seven symbols 306. In some examples, the BS may schedule UE at a frequency-granularity of a RB 310 (e.g., including about 12 subcarriers 304).

Figure 4A:
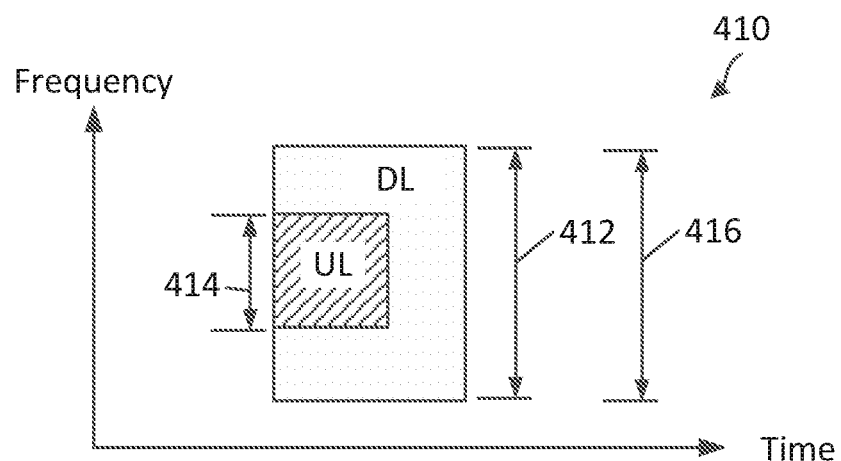
FIG. 4A illustrates a full-duplex communication configuration according to some aspects of the present disclosure.
Figure 4B:
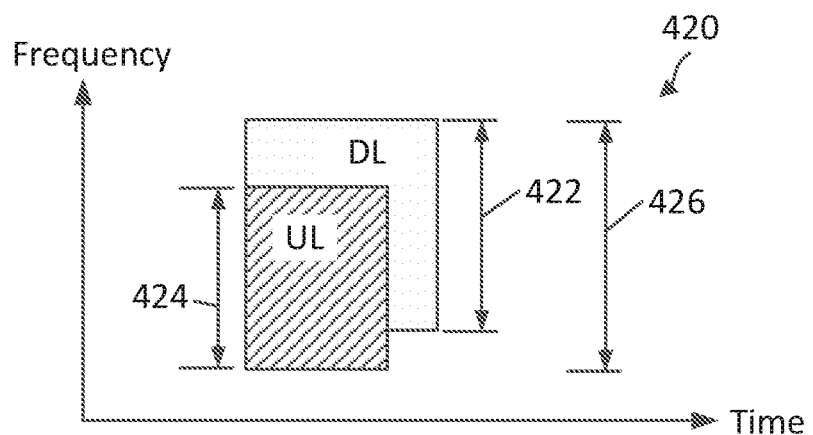
FIG. 4B illustrates a full-duplex communication configuration according to some aspects of the present disclosure.
Figure 4C:
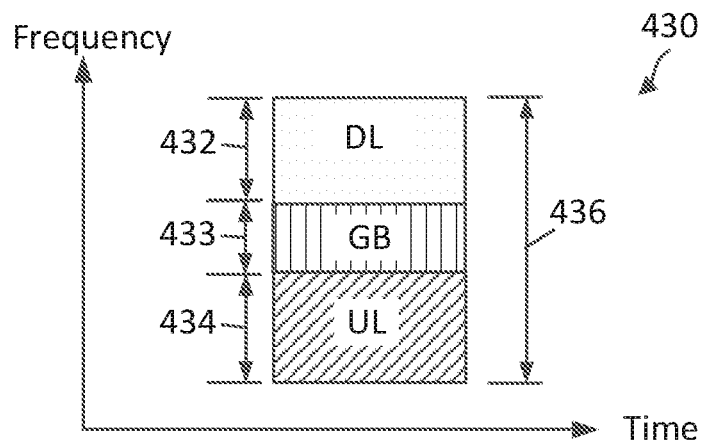
FIG. 4C illustrates a full-duplex communication configuration according to some aspects of the present disclosure.

A slot 302 may be configured as a DL slot with a DL band spanning a channel frequency BW, a UL slot with a UL band spanning a channel frequency BW, or a full-duplex slot including a UL band and a DL band in a channel frequency BW. FIGS. 4A-4C illustrate various full-duplex configurations.

FIG. 4A illustrates a full-duplex communication configuration 410 according to some aspects of the present disclosure. The configuration 410 may be employed by a BS 105 and a UE 115 in a network such as the network 100 in conjunction with the radio frame structure 300 for communications. In FIG. 4A, the x-axis represents time in some arbitrary units, and the y-axis represents frequency in some arbitrary units. In the configuration 410, a UL band 414 may be fully overlapping with a DL band 412 in a channel frequency BW 416 (e.g., in a single unpaired spectrum band). As shown, the UL band 414 is within the DL band 412. The UL band 414 may be used for UL transmissions by the UE 115. The DL band 412 may be used for DL transmissions by the BS 105. The configuration 410 may be referred to as an IBFD mode.

FIG. 4B illustrates a full-duplex communication configuration 420 according to some aspects of the present disclosure. The configuration 420 may be employed by a BS 105 and a UE 115 in a network such as the network 100 in conjunction with the radio frame structure 300 for communications. In FIG. 4B, the x-axis represents time in some arbitrary units, and the y-axis represents frequency in some arbitrary units. In the configuration 420, a UL band 424 may be partially overlapping with a DL band 422 in a channel frequency BW 426 (e.g., in a single unpaired spectrum band). The UL band 424 may be used for UL transmissions by the UE 115. The DL band 422 may be used for DL transmissions by the BS 105. The configuration 420 may also be referred to as an IBFD mode.

FIG. 4C illustrates a full-duplex communication configuration 430 according to some aspects of the present disclosure. The configuration 430 may be employed by a BS such as the BSs 105 and a UE such as the UEs 115 in a network such as the network 100 in conjunction with the radio frame structure 300 for communications. In FIG. 4C, the x-axis represents time in some arbitrary units, and the y-axis represents frequency in some arbitrary units. In the configuration 430, a UL band 434 may be spaced apart from a DL band 432 by a guard band 433 in a channel frequency BW 436 (e.g., in a single unpaired spectrum band). The UL band 434 may be used for UL transmissions by the UE 115. The DL band 432 may be used for DL transmissions by the BS 105. The guard band 433 may be small or narrow, for example, including about 5 RBs (e.g., the RBs 210). The configuration 420 may be referred to as an SFBD mode.

Figure 5:
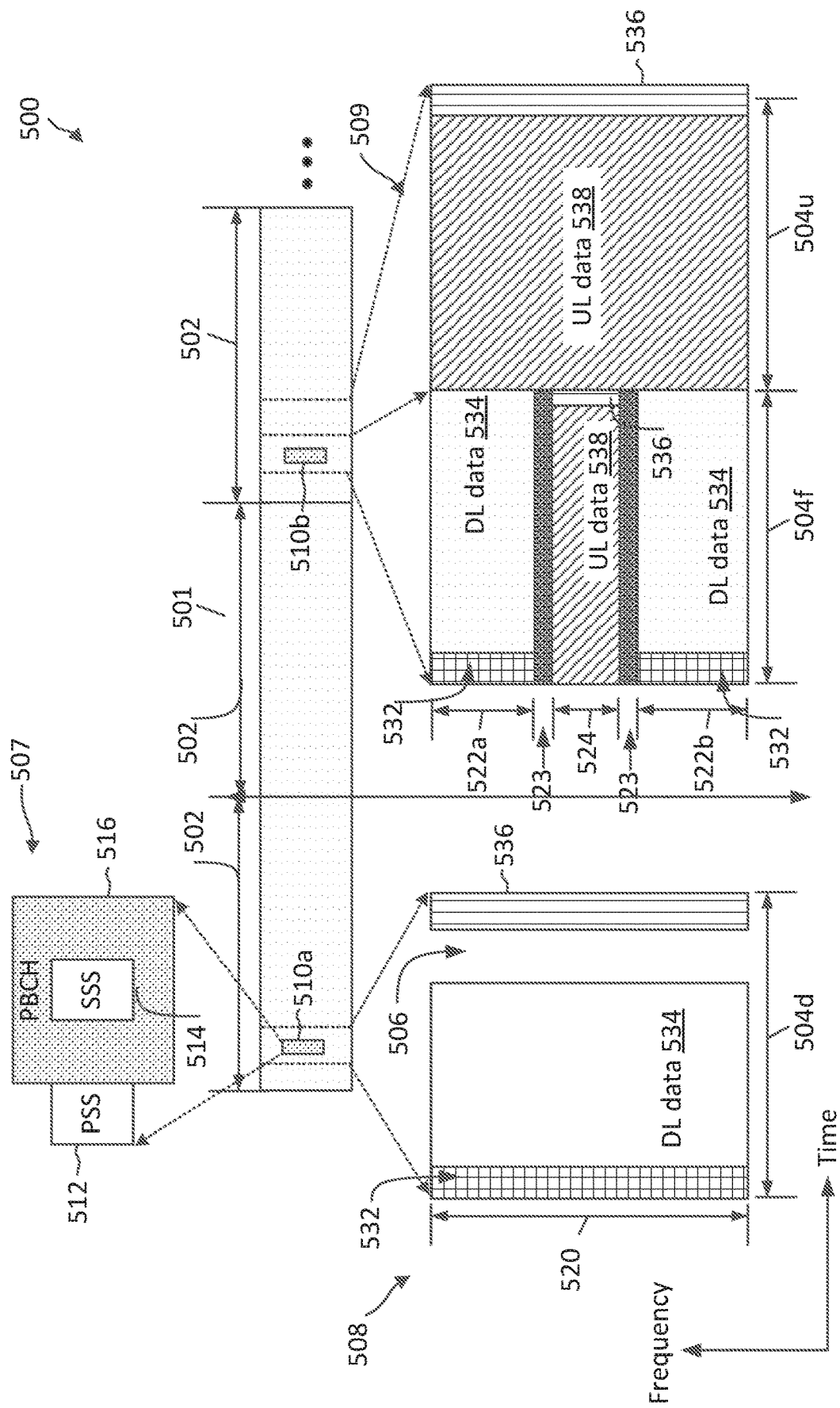
FIG. 5 illustrates a sub-band full-duplex (SBFD) communication configuration according to some aspects of the present disclosure.

FIG. 5 illustrates an full duplex communication scenario 500 according to some aspects of the present disclosure. The scenario 500 may correspond to a wireless communication scenario in the network 100. The x-axis represents time in some arbitrary units, and the y-axis represents frequency in some arbitrary units. The BS 105 may schedule SSBs 510 to be transmitted periodically, for example, at a periodicity of about 10 ms, 20 ms, 50 ms, or 80 ms or more).

In the illustrated example of FIG. 5, the BS 105 may transmit an SSB 510 in every other radio frame 502 (e.g., a repeating interval 501). The SSBs are shown as 510a and 510b. The radio frame 502 may have a frame structure similar to the structure 300. For instance, each radio frame 502 may have a duration of about 10 ms. In NR or 5G, an SCS may be 15 kHz, 30 kHz, 60 kHz, 120 kHz, or 240 kHz, a carrier frequency can be below 3 GHz, between 3 GHz to about 6 GHz, or greater than 6 GHz, and SSB bursts may be transmitted in a first half of a radio frame 502 (e.g., the beginning 5 ms of the radio frame 502). In some instances, the BS 105 may transmit all the prescheduled SSBs 510. The BS 105 may transmit a PSS 512, an SSS 514 and a PBCH signal 516 in each SSB 510 as shown in the expanded view 507. The PSS 512 and the SSS 514 may assist a UE 115 in synchronizing to the network and may provide cell identity information. The PBCH signal 516 may carry a MIB indicating network system information, such as an SCS used by the network and/or resources where the BS 105 may transmit SIB scheduling information.

As discussed above, the BS 105 may configure a combination of DL slots, UL slots, and/or full-duplex slots in a channel frequency BW. The DL slot 504d may include a DL band 520. The DL band 520 may correspond to a channel frequency BW (e.g., the channel frequency BW 316, 326, and/or 336). The channel frequency BW may be at any suitable frequency band (e.g., below 3 GHz, between about 3 GHz to about 6 GHz, or above 6 GHz). The channel frequency BW may include any suitable amount of frequencies (e.g., about 20 MHz, about 80 MHz, about 100 MHz or more). The DL slot 504d may correspond to a slot 302 of FIG. 3. The DL slot 504d may include a DL control portion 532, a DL data portion 534, and a UL control portion 536. Each portion 532, 534, 536 may include time-frequency resources, for example, a number of symbols 306 in time and a number of REs 312 or RBs 310 in frequency as shown in FIG. 3. The BS 105 may transmit DL control information (e.g., PDCCH) in the DL control portion 532. The BS 105 may transmit DL data (e.g., PDSCH) in the DL data portion 534. The BS 105 may schedule a UE 115 to transmit UL control information (e.g., PUCCH including SRS, HARQ ACK/NACKs, and/or channel quality indicator (CQI)) in the UL control portion 536. The UL control portion 536 may be spaced apart from the DL data portion 534 by a gap period 506 to provide time for switching between UL and DL.

When the BS 105 utilizes a combination of DL slots, UL slots, and/or full-duplex slots, the BS 105 may dynamically or semi-statically reconfigure a slot to switch among any of the DL, UL, and/or full-duplex mode. In other words, the BS 105 may utilize the channel frequency BW similar to a TDD mode, but may additionally configure some slots to be full-duplex slots. For instance, the BS 105 may initially configure a slot to be a DL slot and may subsequently reconfigure the slot to be a full-duplex slot, for example, to satisfy a latency criteria of a certain UL URLLC communication. The DL slot 504d may include a UL band 524 located between an upper DL band 522a and a lower DL band 522b within the channel frequency BW. The UL band 524 may be spaced apart from the upper DL band 522a by a guard band 523 and may be spaced apart from the lower DL band 522b by another guard band 523. The guard bands 523 may be significantly narrower than the UL band 524 and the DL bands 522. In some instances, a guard band 523 may include about 5 RBs. Each of the DL band 522a, 522b, and the UL band 524 may include any suitable BW. In an example, the BW for each of the DL band 522a, 522b, and the UL band 524 can be predetermined. In another example, the BS 105 may determine the BW for each of the DL band 522a, 522b, and the UL band 524 based on traffic loading and/or latency requirements. The full-duplex slot 504f may correspond to a slot 302 of FIG. 3. The full-duplex slot 504f may include a DL control portion 532 and a DL data portion 534 in each of the DL bands 522a and 522b. The full-duplex slot 504f may include a UL data portion 538 and a UL control portion 536 in the UL band 524. Similar to the portions 532, 534, 536, the UL data portion 538 may include time-frequency resources, for example, a number of symbols 306 in time and a number of REs 312 or RBs 210 in frequency as shown in FIG. 3. The BS 105 may schedule a UE 115 to transmit UL data (e.g., PUSCH) in the UL data portion 538. In some instances, the full-duplex slot 504f may be followed by a UL slot 504u as shown in the expanded view 509. The UL slot 504u may include a UL band in the channel frequency BW and may include a UL data portion 538 followed by a UL control portion 536. In some other instances, the full-duplex slot 504f may be followed by a DL slot similar to the DL slot 504d. In general, a full-duplex slot 504f can be adjacent to a UL slot 504u and/or a DL slot 504d.

Figure 6:
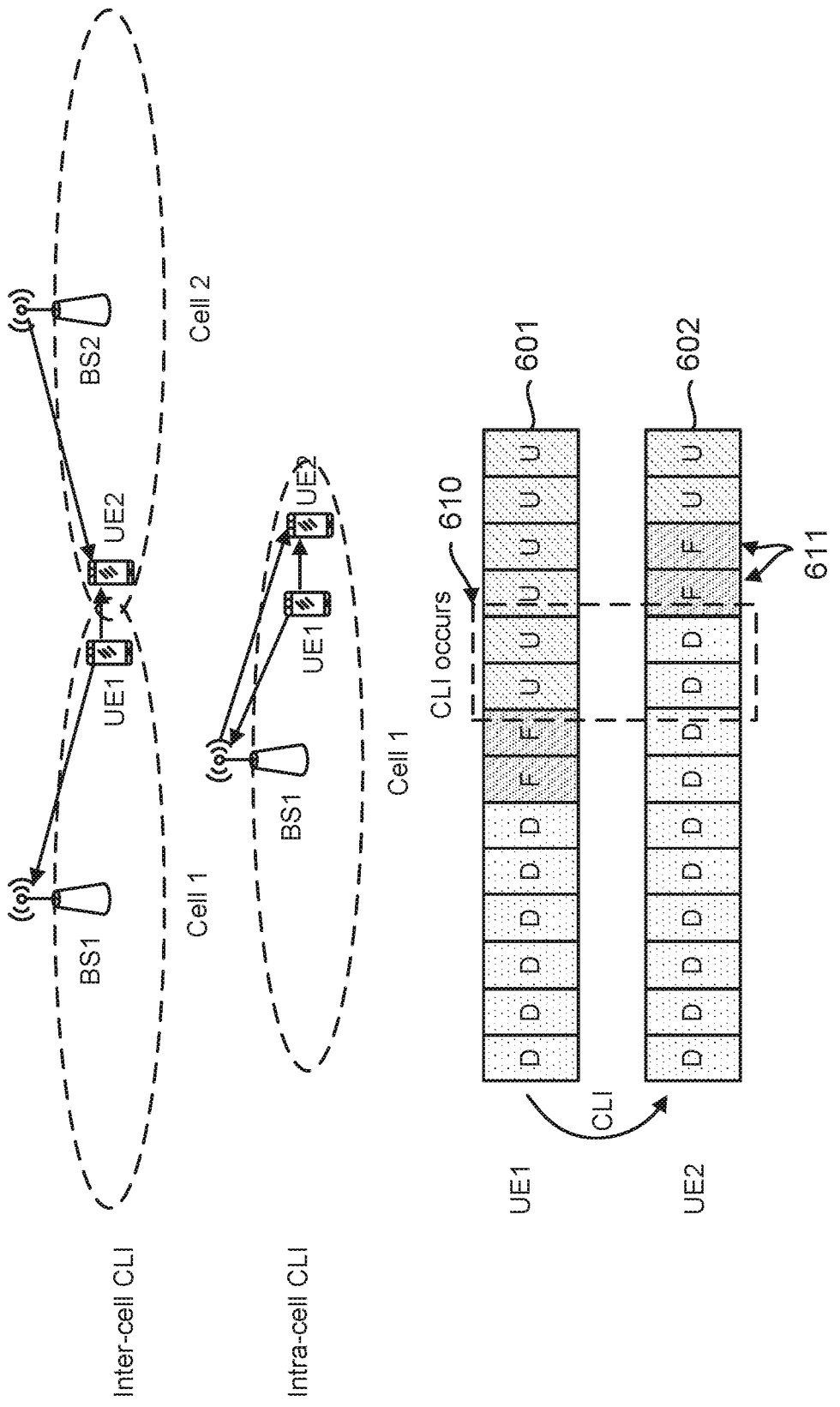
FIG. 6 is an illustration of example crosslink interference scenarios, according to some embodiments.

FIG. 6 is an illustration of example crosslink interference scenarios, according to some embodiments. The UEs and BSs of FIG. 6 may be the same as or similar to the UEs and BSs discussed above with respect to FIG. 1. In short, crosslink interference (CLI) is the interference from one UE to another nearby UE. CLI may occur when one or more networks configured different TDD UL and DL slot formats to nearby UEs. When an aggressor UE is transmitting to a base station, a victim UE may receive this transmission as interference in its DL symbols if the aggressor's UL symbol collides with at least one DL symbol of the victim UE. CLI can occur between two UEs on the same cell or on different cells.

In the "inter-cell" scenario, UE 1 is an aggressor, and its UL transmission causes interference in the downlink symbol of the victim UE, UE 2. In the "intra-cell" scenario, the aggressor UE, UE 1, and the victim UE, UE 2, are in the same cell and communicate with the same BS. Once again, the UL from UE 1 causes interference in the DL of UE 2.

FIG. 6 also includes an illustration of example interference with reference to slots 601 and 602. Slot 601 is assigned to UE 1, and slot 602 is assigned to UE 2. Each of the slots 601, 602 has a slot format. That is, the network configures which ones of the symbols within the slots 601, 602 are for DL, UL, and flexible. In FIG. 6, the symbols labeled "D" are configured for DL, the symbols labeled "U" are configured for UL, and the symbols labeled "F" are configured as flexible and may be configured at any one time for both transmission and reception. Specifically, a flexible symbol may be configured for both CLI measurement and for UL transmission, as explained in more detail below.

In the present example, CLI occurs when a UL transmission from the aggressor UE interferes with a DL reception at the victim UE, as shown by symbols 610. Either or both of the UEs 1 and 2 may measure CLI, and this example focuses on UE 2. UE 2 may be referred to as the victim UE. UE 2 measures CLI in response to network configuration. For instance, UE 2 may measure CLI based on RRC configuration. The RRC configuration may configure one or more CLI measurement resources. CLI measurement in this example is a Layer 3 periodic measurement to determine the presence of a jamming or interfering UE such as an UL from UE 1. For example, UE 2 may be configured with one or more Sounding Reference Signal (SRS) resources such as time-frequency resource(s), sequence(s), cyclic shift(s), periodicity, and so on to measure the UE-to-UE CLI. With regard to such measurements, SRS-Reference Signal Received Power (SRS-RSRP) and Received Signal Strength Indicator (RSSI) may be used as metrics for the CLI measurement. SRS-RSRP may include a linear average of the power contributions of the SRS to be measured over the configured resource elements within the considered measurement frequency bandwidth in the timer resources in the configured measurement occasions. RSSI may include a linear average of the total received power only in certain symbols (e.g., OFDM symbols) of the measurement time resource(s), in the measurement bandwidth and over the configured resource elements for the CLI measurement by the UE. The victim UE (UE 2) may send a measurement report to the network. Based on the CLI measurement report, the network may coordinate the scheduling of the aggressor and victim UEs to balance the UL and DL throughputs. Of course, CLI measurement is not limited to the victim UE in this example, as UE 1 may be a victim of yet another UE (not shown) and may measure and report CLI the same as or similar to UE 2.

Looking at slot 602, CLI may be RRC-configured for any of the symbols labeled D or F. UL may also be independently configured for any of the symbols labeled U or F. Therefore, in some instances, there may be a collision between CLI measurement and UL transmission in a given flexible (F) symbol. For instance, UE 2 may be RRC-configured for CLI measurement in either or both of symbols 611 and may also be either RRC-configured or dynamically (by the physical layer physical layer) scheduled or triggered for UL in either or both of symbols 611 as well. Current NR protocols may state that the UE is not expected to handle the collision between UL and CLI measurement. For instance, the UE is not expected to be configured or scheduled with PUCCH, PUSCH, and SRS in a symbol if the symbol is already configured as a CLI measurement occasion.

However, UE 1 and UE 2 in this example include hardware and/or software logic to provide different functionality. UE 1 and UE 2 in this example may de-prioritize CLI measurement over UL transmission by allowing the UE to transmit PUCCH, PUSCH, or SRS in a symbol in which CLI measurement is configured.

In some aspects, to facilitate CLI measurements obtained by nearby UEs, one or more neighboring UEs in a network may be configured to transmit one or more reference signals during one or more CLI measurement windows or occasions. For example, a UE may be configured to transmit a sounding reference signal (SRS) to facilitate CLI measurements by other UEs. In some aspects, the SRS for CLI may have a similar or identical format and structure as non-CLI SRS. In other aspects, the CLI-SRS may have a structure or format that is different from non-CLI SRS in at least one aspect. In another aspect, the CLI-SRS may be a cell-level configuration such that the CLI-SRS resources may be aligned for different UEs communicating in a network. For the purposes of the present disclosure, a configuration may be a cell-level configuration if the configuration is common to a plurality of devices connected to the cell. For example, a UE may perform a cell selection or RACH procedure to connect to a cell. If successful, the network may transmit a cell configuration to the UE indicating one or more parameters for communicating on the cell. The cell configuration may include or indicate, for example, reference signal resources, measurement resources, transmission power parameters, and/or any other suitable parameter for communicating on the cell. The cell configuration may indicate CLI-SRS transmission resources and/or measurement resources for the cell. In some aspects, the cell configuration may also be referred to as a component carrier (CC) configuration, a frequency resource configuration, and/or a bandwidth part (BWP) configuration. The cell configuration may indicate one or more parameters for the CLI-SRS. Further, one or more of the UEs may be configured with a CLI measurement resource. For example, one or more of the UEs operating in the cell using a full duplex mode may be configured with a non-zero power (NZP) CLI-SRS or zero power (ZP) CLI-SRS measurement resource. Accordingly, in some aspects, both the CLI-SRS transmission resources and the CLI-SRS measurement resources may be cell-level resources based on or associated with one or more cell configurations.

CLI-SRS resources may include periodic, semi-persistent, and/or aperiodic resources. For example, the CLI-SRS resources may be periodic and configured for transmission without receiving an activation. In other aspects, the CLI- SRS resources may be semi-persistent. For example, the periodicity and resources are known and are triggered by an activation. In some aspects, receiving an activation may include receiving a media access control control element (MAC-CE) indicating the CLI-SRS resource activation. In another aspect, receiving the activation may include receiving a DCI activating one or more aperiodic CLI-SRS resources.

As similarly described above with respect to CLI measurements, there may be a collision or scheduling conflict between a CLI-SRS and a UL transmission. For instance, a UE may be configured with a periodic SRS that collides with at least one occasion of a semi-persistent or aperiodic CLI-SRS. In some aspects, the UE may not be expected to handle a collision between at least some UL transmissions and/or SL transmission (e.g., PUCCH, PSFCH) and CLI-SRS. The present disclosure describes schemes and mechanisms for handling and/or avoiding scheduling collisions of a CLI-SRS and at least one other UL and/or SL communication scheduled for transmission. Further aspects of the present disclosure describe power allocation rules and configurations for transmitting CLI-SRS concurrently with one or more other UL/SL communications on different carriers in carrier aggregation (CA) mode. As explained below, aspects of the present disclosure apply to Uu communications as well as SL communications. For example, CLI-SRS priority configurations may be used to resolve collisions or conflicts between multiple Uu communications, between multiple SL communications, and/or between Uu and SL communications. Further, CLI-SRS power allocation priority configurations may be used to allocate or distribute power between multiple Uu communications, between multiple SL communications, and/or between Uu and SL communications.

Figure 7:
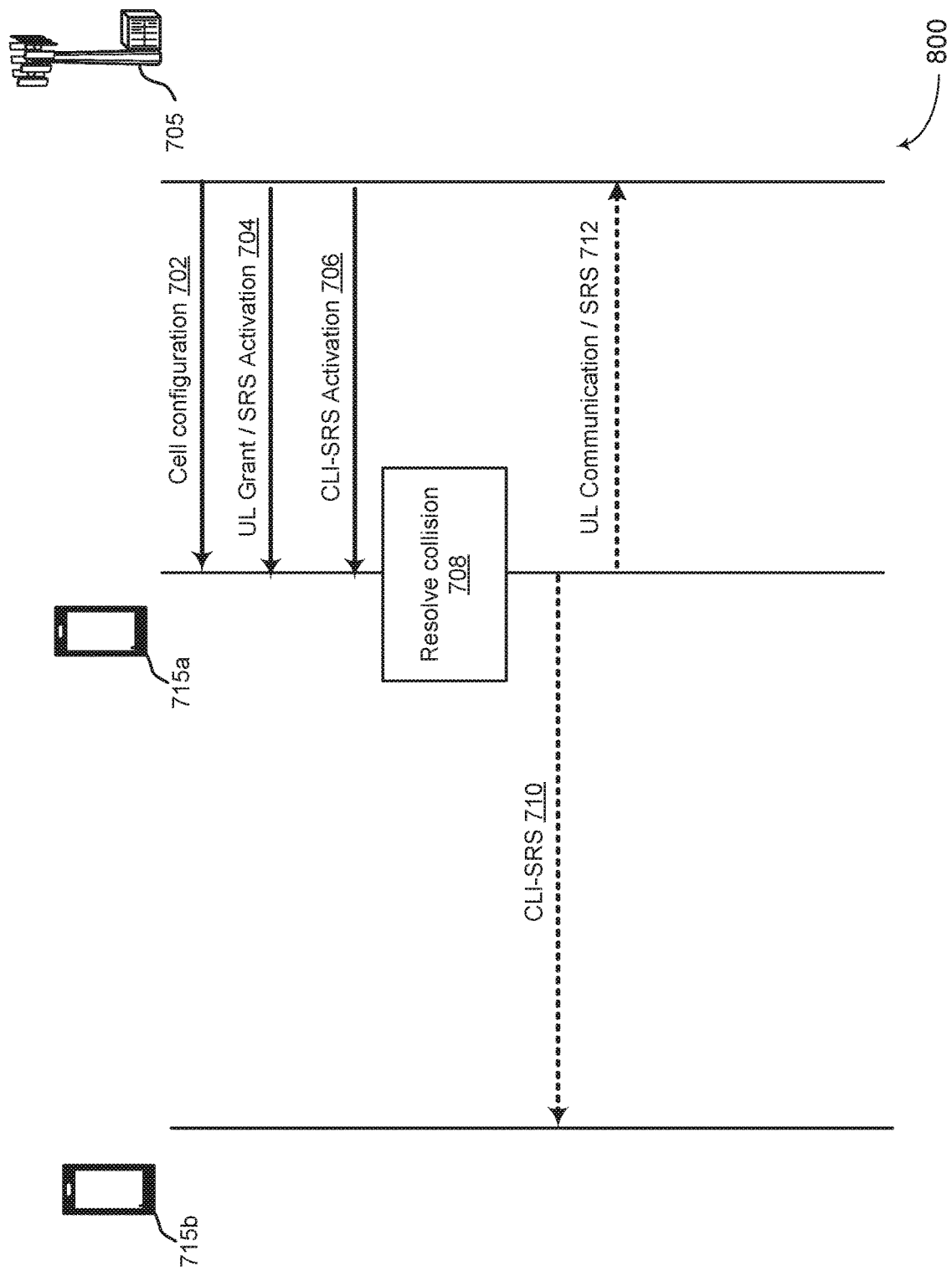
FIG. 7 is a signaling diagram of a wireless communication method based on a cross-link interference (CLI) sounding reference signal (SRS) prioritization configuration, according to some aspects of the present disclosure.

FIG. 7 is a signaling diagram illustrating a method 700 for handling collisions between a CLI-SRS and one or more other UL and/or SL communications scheduled for transmission, according to aspects of the present disclosure. The actions of FIG. 7 are performed by a first UE 715a, a second UE 715b, and a BS 705. The UEs 715 may be any of the UEs illustrated in FIG. 1A or 2, for example. In some aspects, one or more actions of FIG. 7 may be performed by a processor in a UE executing computer code to perform the functionality illustrated in FIG. 7.

At action 702, the BS 705 transmits, and the first UE 715a receives, a cell configuration for at least a first cell. The cell configuration may be referred to as a CC configuration and/or a BWP configuration, in some aspects. The cell configuration may indicate, or be associated with, a CC and/or BWP. The cell configuration may be associated with Uu communications and/or SL communications. The cell configuration may indicate UL, DL, and/or SL BWP configurations, measurements parameters, DL control channel monitoring configurations, timing advance parameters, beam management parameters, and/or any other suitable parameter or configuration associated with the first cell. The first cell may be a primary cell (Pcell), a special cell (SpCell), a secondary cell (Scell), and/or any suitable type of cell. In some aspects, action 702 may include communicating more than one cell configuration associated with more than one serving cell. For example, the first UE 715a may be configured to operate in a carrier aggregation (CA) mode in which the first UE 715a may communicate with more than one serving cell. For example, the first UE 715a may receive cell configurations for a Pcell and at least one Scell.

The cell configuration may be associated with a serving cell index. In some aspects, the first UE 715a may be configured with one or more CLI-SRS transmission resources and/or parameters. In this regard, a plurality of UEs operating in the cell may be configured with the same CLI-SRS transmission resource. Accordingly, the CLI-SRS transmission resources or configurations may be referred to as cell-level resources or configurations.

At action 704, the BS 705 transmits, and the first UE 715a receives, at least one of a UL grant or an SRS activation signal. The UL grant may indicate time/frequency resources for a PUCCH and/or a PUSCH. In other aspects, action 704 may include receiving a DL communication signal. The DL communication signal may include DCI and/or DL data. The first UE 715a may be configured to transmit ACK/NACK for the DL data based on a HARQ protocol. In some aspects, communicating the SRS activation may include communicating DCI to dynamically trigger one or more aperiodic SRS occasions. In other aspects, communicating the SRS activation may include communicating a MAC-CE to activate a semi-persistent SRS resource set.

As discussed further below, the UL grant and/or SRS activation communicated at action 704 may trigger or indicate a communication by the first UE 715a for a set of time/frequency resources. In some aspects, the set of time/frequency resources indicated in the UL grant and/or SRS activation may indicate one or more time windows for the first UE 715a to transmit a UL communication and/or SRS. In another aspect, if the first UE 715a receives a DL signal at action 704, the UE 715a may be configured to transmit a response within the one or more time windows.

At action 706, the BS 705 transmits, and the first UE 715a receives, a CLI-SRS activation associated with the first cell. In some aspects, communicating the CLI-SRS activation may include communicating DCI to dynamically trigger one or more aperiodic CLI-SRS occasions. In other aspects, communicating the CLI-SRS activation may include communicating a MAC-CE to activate a semi-persistent CLI-SRS resource set. However, in some aspects, the method 700 may not include receiving a CLI-SRS activation. For example, the first UE 715a may be configured with a periodic CLI-SRS resource set which is activated based on the cell configuration received at action 702. The CLI-SRS resource sets may include periodic, semi-persistent, and/or aperiodic CLI-SRS resource sets.

In some aspects, the CLI-SRS resource set for the serving cell may include one or more CLI-SRS occasions occupying a set of time resources. In some instances, one or more of the CLI-SRS occasions may at least partially overlap in time with a UL communication or SL communication scheduled based on the UL grant, SRS activation, and/or DL communication received at action 706. In some aspects, the one or more of the CLI-SRS occasions may also at least partially overlap in frequency with the UL communication or SL communication scheduled based on the UL grant, SRS activation, and/or DL communication received at action 706. Accordingly, the first UE 715a may experience a scheduling conflict or collision for at least one time window.

At action 708, the first UE 715a resolves the scheduling collision between the CLI-SRS and the UL/SL communication. The present disclosure describes a plurality of collision resolution and avoidance schemes that may be used. For example, the present disclosure provides priority rules and power allocation rules for cell-level CLI-SRS with respect to other UL and/or SL communications, including PUCCH, PUSCH, PSCCH, PSSCH, PSFCH, SRS, and/or any other UL/SL communication. Examples of priority-based collision resolution schemes for CLI-SRS as employed in action 708 are illustrated in FIGS. 11-14.

Figure 11:
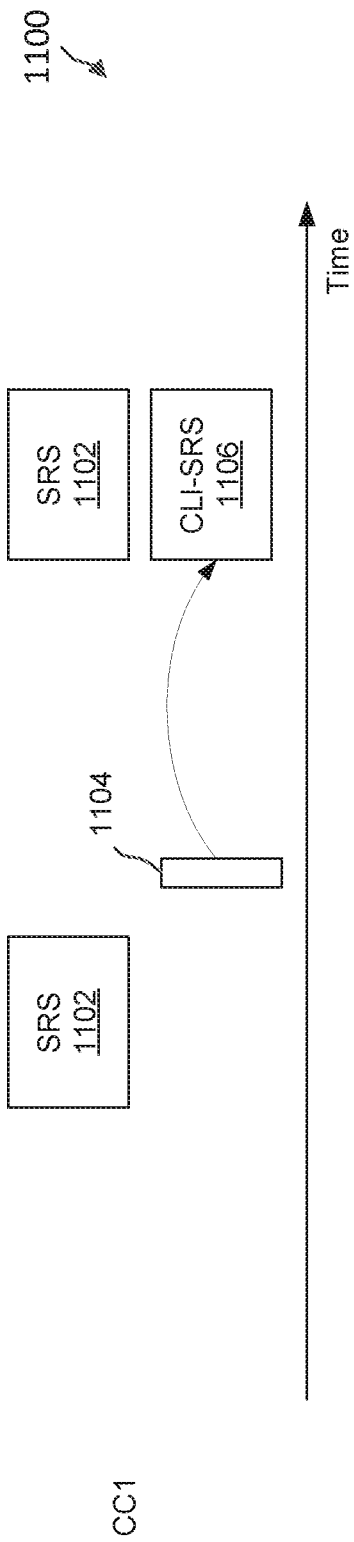
FIG. 11 is a timing diagram of colliding UL communications, according to some aspects of the present disclosure.

Referring to FIGS. 7 and 11, a collision resolution scheme may be used in a first full duplex communication scenario 1100. The scenario 1100 may occur in at least a first carrier CC1. For example, the first UE 715a may be configured with a periodic or semi-persistent SRS resource set including a plurality of SRS occasions 1102. It will be understood that the SRS occasions 1102 may be non-CLI SRS occasions. The first UE 715a may receive an activation signal 1104 activating or indicating a CLI-SRS resource 1106. As explained above, receiving the activation signal 1104 may include receiving a MAC-CE activating a semi-persistent CLI-SRS resource set. In another aspect, receiving the activation signal 1104 may include receiving a DCI indicating an aperiodic CLI-SRS resource or resource set. The CLI-SRS resource 1106 collides or conflicts with a scheduled SRS resource 1102. In this regard, the CLI-SRS resource 1106 may overlap at least partially in time and frequency with at least one of the SRS resources 1102.

Figure 12:
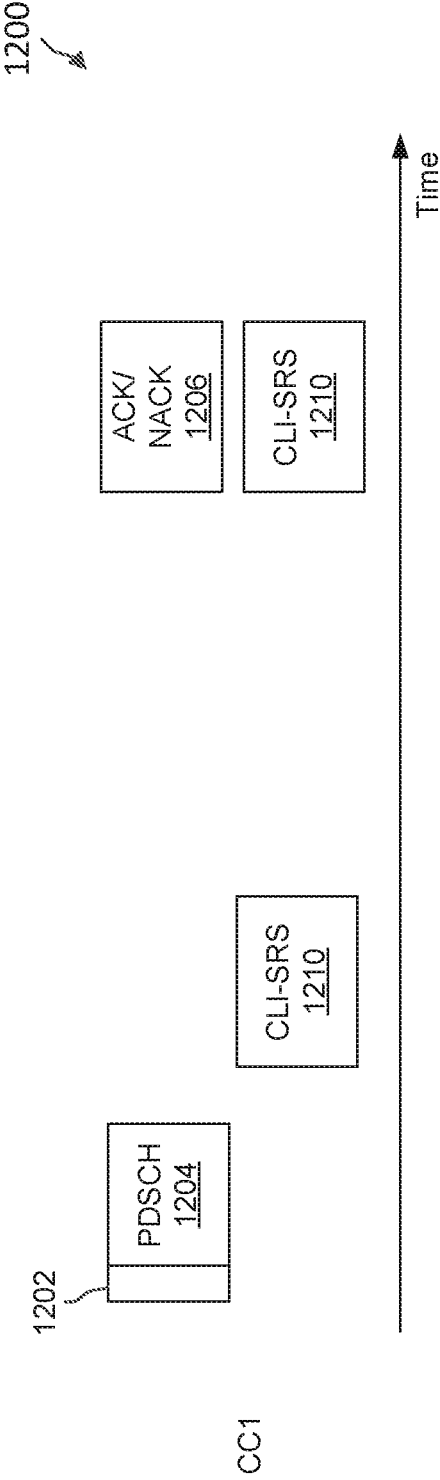
FIG. 12 is a timing diagram of colliding UL communications, according to some aspects of the present disclosure.

Referring to FIGS. 7 and 12, a collision resolution scheme may be used in a second full duplex communication scenario 1200. The scenario 1200 may occur in at least a first carrier CC1. The first UE 715a may receive, in a PDCCH monitoring occasion, a DCI 1202 and an accompanying PDSCH communication 1204. The DCI 1202 may indicate time resources for transmitting ACK/NACK 1206. Further, the first UE 715a may be configured with a semi-persistent or periodic CLI-SRS resource set including a plurality of CLI-SRS occasions 1210. At least one of the CLI-SRS occasions 1210 collides or conflicts with the scheduled ACK/NACK resources 1206. In this regard, the CLI-SRS resource 1210 may overlap at least partially in time and frequency with the scheduled ACK/NACK resources 1206.

Referring to FIGS. 7 and 13, a collision resolution scheme may be used in a third full duplex communication scenario 1300. The scenario 1300 may occur in at least a first carrier CC1. For example, the first UE 715a may be configured with a periodic or semi-persistent SRS resource set including a plurality of SRS occasions 1302. It will be understood that the SRS occasions 1302 may be non-CLI SRS occasions. The first UE 715a may receive an activation signal 1304 activating or indicating a CLI-SRS resource 1306. As explained above, receiving the activation signal 1304 may include receiving a MAC-CE activating a semi-persistent CLI-SRS resource set. In another aspect, receiving the activation signal 1304 may include receiving a DCI indicating an aperiodic CLI-SRS resource or resource set. The CLI-SRS resource 1306 collides or conflicts with a scheduled SRS resource 1302. In this regard, the CLI-SRS resource 1306 may overlap at least partially in time and frequency with at least one of the SRS resources 1302. In this regard, the at least one SRS resource 1302 may include a non-overlapping portion 1301 and an overlapping portion 1303. In some aspects, the overlapping portion 1303 may include any symbols of the SRS resource 1302 that align in time within any symbols of the CLI-SRS resource 1306, and may further include one or more symbols preceding and/or following the first and/or last symbol of the CLI-SRS resource 1306.

With reference to the scenarios 1100-1300 and the method 700, the first UE 715a may apply one or more CLI-SRS priority rules or configurations to resolve conflicts with CLI-SRS resources and other SL and/or UL resources or scheduled communications. In some aspects, resolving the conflicting or colliding resources may involve refraining from transmitting one communication and proceeding to transmit the other. In other aspects, resolving the conflicting resources may involve dropping one or more overlapping symbols from at least one of the communications.

For the purpose of the present disclosure, a CLI-SRS priority configuration may refer to one or more rules or protocols carried out by a UE 715 and/or the BS 705 to resolve and/or prevent collisions of CLI-SRS resources with other UL/SL resources. In some aspects, the CLI-SRS priority configuration may be a static or hard coded configuration. Further, in some aspects, the CLI-SRS priority configuration may include a hard coded BS configuration which may prevent activating or configuring UL/SL resources that would collide with a CLI-SRS resource, and/or may prevent activating or configuring CLI-SRS resources that would collide with another UL/SL resource.

In some aspects, the first UE 715a may drop either the CLI-SRS or one or more coinciding UL/SL scheduled resources. For example, the UE 715a may determine which of the CLI-SRS or the coinciding UL/SL communication is associated with a higher priority. Thus, the first UE 715a may transmit either the CLI-SRS or the coinciding UL/SL communication based on a comparison of the priority of the CLI-SRS and a priority of the coinciding UL/SL communication. In other aspects, the priority of the CLI-SRS with respect to other UL/SL communications may depend on the time configuration and/or type of the UL/SL communication. In some aspects, the priority of the CLI-SRS may be based on the time configuration of the CLI-SRS. For example, the priority of the CLI-SRS with respect to other UL/SL communications may be based on whether the CLI-SRS resources are periodic, semi-persistent, or aperiodic. In some aspects, the priority of the CLI-SRS with respect to another UL/SL communication may be based on whether the other UL/SL communication includes a PUCCH communication, a PUSCH communication, a PSCCH communication, a PSSCH communication, a PSFCH communication, and/or a non-CLI SRS.

In one example, the first UE 715a may be configured to drop, or refrain from transmitting, at least a portion of the CLI-SRS if the CLI-SRS collides with a PUSCH with a priority index 0. In another aspect, the first UE 715a may be configured to drop, or refrain from transmitting, at least a portion of the CLI-SRS if the CLI-SRS collides with a PUSCH with a priority index 1. In some aspects, if the CLI-SRS resources are semi-persistent or periodic, the first UE 715a may be configured to refrain from transmitting at least a portion of the CLI-SRS if the CLI-SRS collides with a PUCCH carrying channel state information (CSI) reports, RSRP reports, and/or SINR reports. In some aspects, the first UE 715a may be configured to refrain from transmitting at least a portion of the CLI-SRS if the CLI-SRS collides with a PUCCH carrying HARQ-ACK information, a link recovery request, and/or a scheduling request. In some aspects, if the CLI-SRS resources are aperiodic, the first UE 715a may be configured to refrain from transmitting at least a portion of a PUCCH carrying CSI reports, RSRP reports, and/or SINR reports, if the CLI-SRS collides with the PUCCH. In another aspect, the first UE 715a may be configured to refrain from transmitting at least a portion of a periodic or semi-persistent CLI-SRS if the CLI-SRS collides with an aperiodic non-CLI SRS. In another aspect, the first UE 715a may be configured to refrain from transmitting at least a portion of a non-CLI SRS if a CLI-SRS collides with the non-CLI SRS. In another aspect, the first UE 715a may be configured to refrain from transmitting at least a portion of a periodic or semi-persistent non-CLI SRS if an aperiodic CLI-SRS collides with the non-CLI SRS.

In some aspects, the first UE 715a may be configured to refrain from transmitting a dynamic PUSCH with priority 0 if the dynamic PUSCH would collide with an aperiodic CLI-SRS. In another aspect, the first UE 715a may be configured to refrain from transmitting a SPS PUSCH if the SPS PUSCH would collide with an aperiodic CLI-SRS. In another aspect, the first UE 715a may be configured to refrain from transmitting a CLI-SRS if the CLI-SRS would collide with a PUCCH carrying a scheduling request, HARQ response, and/or a link recovery request. In another aspect, if an aperiodic CLI-SRS would collide with a configured grant (CG) PUSCH, the first UE 715a may be configured to drop the CG-PUSCH and transmit the CLI-SRS.

In other aspects, as illustrated in the scenario 1300 of FIG. 13, the first UE 715a may be configured to drop one or more overlapping symbols of a CLI-SRS or another UL/SL communication. For example, in some aspects, if a PUSCH and/or a PUCCH having a priority of 1 overlaps with a CLI-SRS resource, the first UE 715a may drop the overlapping symbols of the CLI-SRS. In another aspect, if an aperiodic CLI-SRS would collide with a periodic or semi-persistent SRS, the UE may drop the overlapping symbols of the periodic or semi-persistent SRS. In another aspect, if an aperiodic CLI-SRS would collide with a periodic or semi-persistent CLI-SRS, the UE may drop the overlapping symbols of the periodic or semi-persistent CLI-SRS. In another aspect, if an aperiodic SRS would collide with a semi-persistent or periodic CLI-SRS, the first UE 715a may drop the overlapping symbols of the CLI-SRS. In another aspect, if a semi-persistent CLI-SRS would collide with a periodic SRS, the first UE 715a may be configured to drop the overlapping symbols of the periodic SRS. In another aspect, if a semi-persistent CLI-SRS would collide with a periodic CLI-SRS, the first UE 715a may be configured to drop the overlapping symbols of the periodic CLI-SRS.

In some aspects, the CLI-SRS priority configuration may indicate one or more of the rules described above. In other aspects, the CLI-SRS priority configuration may indicate a priority of a CLI-SRS relative to other CLI-SRSs and/or other UL/SL communications. In other aspects, the CLI-SRS priority configuration may indicate a priority value or rank of each type of communication, including aperiodic CLI-SRS, semi-persistent CLI-SRS, periodic CLI-SRS, non-CLI SRS, PUCCH, PUSCH, PSSCH, PSCCH, PSFCH, and/or any other type of UL or SL communication.

At action 710, the first UE 715a transmits, and the second UE 715b receives, a CLI-SRS. The transmission of the CLI-SRS may be based on the CLI-SRS priority configuration described above. Further, the transmission of the CLI-SRS may be based on a CLI-SRS timing or time configuration. For example, the transmission of the CLI-SRS may be based on the CLI-SRS activation communicated at action 706. In other aspects, the CLI-SRS transmission may be based on a periodic configured set of CLI-SRS resources. The CLI-SRS may be transmitted during a CLI-SRS measurement window configured for the second UE 715b.

At action 712, the first UE 715a transmits, and the BS 705 receives, at least one of a UL communication or a non-CLI SRS. As similarly described above, transmission of the UL communication and/or SRS may be based on the CLI-SRS priority configuration described above. In some aspects, action 712 includes the first UE 715a transmitting at least one of a PUCCH or a PUSCH to the BS 705. In some aspects, the PUCCH and/or the PUSCH may be associated with a priority of 0 or 1. In some aspects, action 712 may include transmitting a PUCCH. For example, the PUCCH may carry at least one of a HARQ-ACK, a scheduling request, and/or a link recovery request. In other aspects, action 712 may include transmitting a non-CLI SRS. The SRS may be periodic, aperiodic, or semi-persistent.

Referring to actions 710 and 712, the signaling arrows are shown as dashed lines, which may indicate alternative scenarios in which one communication is dropped in favor of another communication based on the collision resolution of action 708. For example, in some aspects, action 710 is performed by the first UE 715a, but the UL communication or SRS of action 712 may be dropped and not transmitted. In another example, action 710 may not be performed such that the CLI-SRS is dropped in favor of the UL communication or SRS. In other aspects, both communication of actions 710 and 712 may be performed with overlapping symbols being dropped, as explained above. In a further aspect, the method 700 may include the second UE 715b transmitting, and the BS 705 receiving, a CLI measurement report based on the CLI-SRS communicated at action 710.

The prioritization of CLI-SRS with respect to other UL communications as described above may be configured at the UEs 715 and/or at the BS 705. For example, although aspects of the method 700 are described as collisions resolved by the first UE 715a, it will be understood that the network, including the BS 705, may be configured to prevent scheduling collisions based on the CLI-SRS prioritization rules described above, such that the first UE 715a does not expect to receive UL grants, SRS activations, and/or CLI-SRS activations that would result in a collision. For example, the network may prioritize PUCCH, PUSCH, and/or aperiodic SRS by activating CLI-SRS resources that do not collide or overlap with the PUCCH, PUSCH, and/or aperiodic SRS resources. For example, the BS 705 may be configured to transmit a CLI-SRS activation such that the CLI-SRS resource does not overlap with a lower-priority UL communication.

Figure 8:
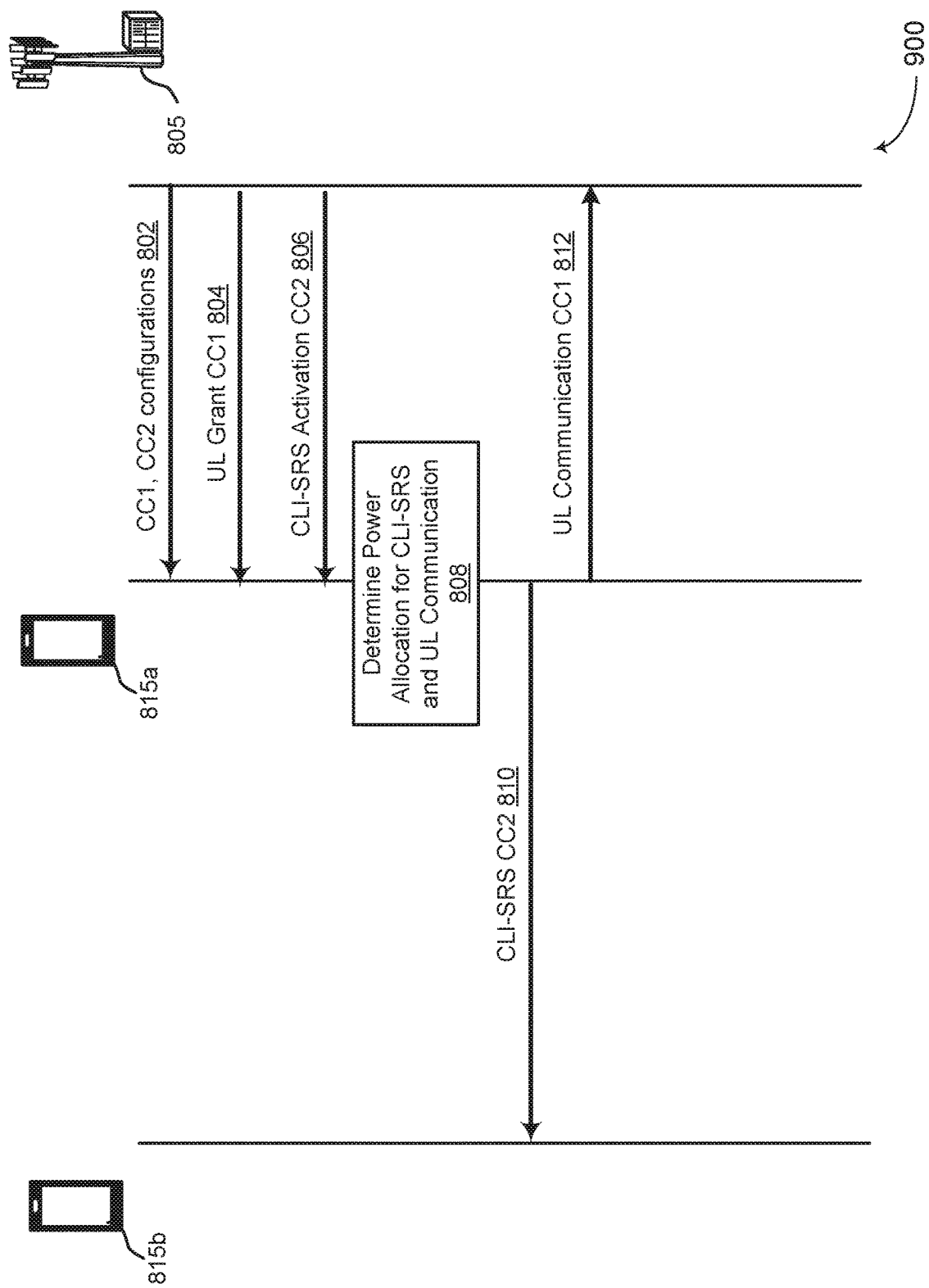
FIG. 8 is a signaling diagram of a wireless communication method based on a CLI-SRS power allocation priority configuration, according to some aspects of the present disclosure.

FIG. 8 is a signaling diagram illustrating a method 800 for power allocation of CLI-SRS and one or more other UL and/or SL communications scheduled for transmission, according to aspects of the present disclosure. The actions of FIG. 8 are performed by a first UE 815a, a second UE 815b, and a BS 805. The UEs 815 may be any of the UEs illustrated in FIG. 1A or 2, for example. In some aspects, one or more actions of FIG. 8 may be performed by a processor in a UE executing computer code to perform the functionality illustrated in FIG. 8. One or more of the UEs 815 may be configured for carrier aggregation (CA) in which the UEs 815 are configured with two or more serving cells.

At action 802, the BS 805 transmits, and the first UE 815a receives, cell configurations for a first cell (CC1) and a second cell (CC2). The cell configurations may be referred to as CC configurations and/or BWP configurations, in some aspects. The cell configuration may be associated with Uu communications and/or SL communications. The cell configurations may indicate UL, DL, and/or SL BWP configurations, measurements parameters, DL control channel monitoring configurations, timing advance parameters, beam management parameters, and/or any other suitable parameter or configuration associated with CC1 and CC2. The first cell CC1 may be a Pcell, SpCell, Scell, and/or any other type of cell. The second cell CC2 may be a Pcell, SpCell, Scell, and/or any other type of cell.

The cell configurations may each be associated with a serving cell index. In some aspects, the first UE 815a may be configured with one or more CLI-SRS transmission resources and/or parameters. In this regard, a plurality of UEs operating in each cell CC1, CC2 may be configured with the same CLI-SRS transmission resource. Accordingly, the CLI-SRS transmission resources or configurations may be referred to as cell-level resources or configurations.

At action 804, the BS 805 transmits, and the first UE 815a receives, at least one of a UL grant or an SRS activation signal associated with CC1. The UL grant may indicate time/frequency resources on CC1 for a PUCCH and/or a PUSCH. In other aspects, action 804 may include receiving a DL communication signal. The DL communication signal may include DCI and/or DL data. The first UE 815a may be configured to transmit ACK/NACK for the DL data based on a HARQ protocol. In some aspects, communicating the SRS activation may include communicating DCI to dynamically trigger one or more aperiodic SRS occasions. In other aspects, communicating the SRS activation may include communicating a MAC-CE to activate a semi-persistent SRS resource set.

As discussed further below, the UL grant and/or SRS activation communicated at action 804 may trigger or indicate a communication by the first UE 815a for a set of time/frequency resources on CC1, or on another cell. In some aspects, the set of time/frequency resources indicated in the UL grant and/or SRS activation may indicate one or more time windows for the first UE 815a to transmit a UL communication and/or SRS. In another aspect, if the first UE 815a receives a DL signal at action 804, the UE 815a may be configured to transmit a response within the one or more time windows.

At action 806, the BS 805 transmits, and the first UE 815a receives, a CLI-SRS activation for one or more CLI-SRS resources on the second cell CC2. In some aspects, communicating the CLI-SRS activation may include communicating DCI to dynamically trigger one or more aperiodic CLI-SRS occasions. In other aspects, communicating the CLI-SRS activation may include communicating a MAC-CE to activate a semi-persistent CLI-SRS resource set. However, in some aspects, the method 800 may not include receiving a CLI-SRS activation. For example, the first UE 815a may be configured with a periodic CLI-SRS resource set which is activated based on the cell configuration for CC2 received at action 802 The CLI-SRS resource sets may include periodic, semi-persistent, and/or aperiodic CLI-SRS resource sets. Accordingly, the UE 815a may apply the CLI-SRS resource set indicated for CC2.

In some aspects, the CLI-SRS resource set for the serving cell may include one or more CLI-SRS occasions occupying a set of time resources. In some instances, one or more of the CLI-SRS occasions may at least partially overlap in time with a UL communication or SL communication scheduled based on the UL grant, SRS activation, and/or DL communication received at action 806, although scheduled for different cells. An example of an overlapping timing configuration is illustrated in FIG. 15. As shown in FIG. 15, the UE may receive, on CC1, a PDCCH and PDSCH transmission 1502. In some aspects, the PDCCH may include a DCI indicating a UL grant for a PUSCH 1504 in the time window coinciding with the CLI-SRS resource. In other aspects, the PDCCH and/or the PDSCH may indicate or trigger a PUCCH carrying a HARQ-ACK communication in the PUCCH/PUSCH resource 1504. In the illustrated example, the PUCCH/PUSCH transmission 1504 overlaps in time with the CLI-SRS resource 1506. Although scheduled for different cells, the UE 815a may be subject to transmission power limitations or rules for the simultaneous transmissions of the CLI-SRS 1506 and the PUCCH/PUSCH 1504. For example, the first UE 815a may be limited to a transmit power of P_cmax for simultaneous transmissions within a frequency range. Accordingly, the first UE 815a may be configured to allocate power to UL and/or SL transmissions based on a power allocation prioritization.

At action 808, the first UE 815a determines a power allocation for the CLI-SRS on CC2 and UL communication on CC1 based on a CLI-SRS power allocation priority configuration. According to aspects of the present disclosure, the first UE 815a may be configured with a CLI-SRS power allocation priority configuration. In some aspects, the CLI-SRS priority configuration may include or indicate the CLI-SRS power allocation priority configuration. For example, the CLI-SRS power allocation priority configuration may include or indicate a priority ranking of CLI-SRS with respect to other UL/SL communications. For example, the CLI-SRS power allocation priority configuration may indicate the power allocation priorities of a plurality of UL communications, including CLI-SRS communications. In some aspects, the CLI-SRS power allocation priority configuration may indicate eight or more priority rankings according to the table below:

| Priority rank (1 being highest) | Types of UL communications |
| --- | --- |
| 1 | PRACH transmission on the Pcell |
| 2 | PUCCH or PUSCH transmissions with priority index 1 |
| 3 | PUCCH or PUSCH transmissions with priority index 0 |
| 4 | PUCCH transmission with HARQ-ACK information, and/or SR, and/or LRR, or PUSCH transmission with HARQ-ACK information |
| 5 | PUCCH transmission with CSI or PUSCH transmission with CSI |
| 6 | PUSCH transmission without HARQ-ACK information or CSI and, for Type-2 random access procedure, PUSCH transmission on the Pcell |
| 7 | CLI-SRS with AP having higher priority than SP/P |
| 8 | SRS transmission, with aperiodic SRS having higher priority than semi-persistent and/or periodic SRS, or PRACH transmission on a serving cell other than the PCell |

In another aspect, the rankings of numbers 6 and 7 in the table above may be switched such that the CLI-SRS power allocation priority configuration follows the table below:

| Priority rank (1 being highest) | Types of UL communications |
| --- | --- |
| 1 | PRACH transmission on the Pcell |
| 2 | PUCCH or PUSCH transmissions with priority index 1 |
| 3 | PUCCH or PUSCH transmissions with priority index 0 |
| 4 | PUCCH transmission with HARQ-ACK information, and/or SR, and/or LRR, or PUSCH transmission with HARQ-ACK information |
| 5 | PUCCH transmission with CSI or PUSCH transmission with CSI |
| 6 | CLI-SRS with AP having higher priority than SP/P |
| 7 | PUSCH transmission without HARQ-ACK information or CSI and, for Type-2 random access procedure, PUSCH transmission on the Pcell |
| 8 | SRS transmission, with aperiodic SRS having higher priority than semi-persistent and/or periodic SRS, or PRACH transmission on a serving cell other than the PCell |

As indicated above, CLI-SRS transmissions may be ranked relative to other UL communications. Further, CLI-SRS transmissions of one timing type (e.g., aperiodic, semi-persistent) may be prioritized relative to other CLI-SRS transmissions of another timing type (e.g., semi-persistent, periodic). Non-CLI SRS transmissions may be similarly prioritized based on timing type.

In other aspects, CLI-SRS may be ranked equally with non-CLI SRS. In other aspects, CLI-SRS may be ranked lower than non-CLI SRS. In some aspects, aperiodic CLI-SRS may have a different priority rank relative to other UL communications than semi-persistent and/or periodic CLI-SRS. For example, in some aspects, aperiodic CLI-SRS may have a higher power allocation priority ranking compared to PUSCH that does not carry UCI and/or CSI.

At action 810, the first UE 815*a* transmits the CLI-SRS on CC2 based on the priority allocation prioritization described above with respect to action 808. At action 812, the first UE 815*a* transmits, and the BS 805 receives, the UL communication on CC1 based on the priority allocation prioritization discussed above. In some aspects, the power allocation prioritization may result in more power being allocation to the CLI-SRS on CC2, or to the UL communication on CC1.

Figure 9:
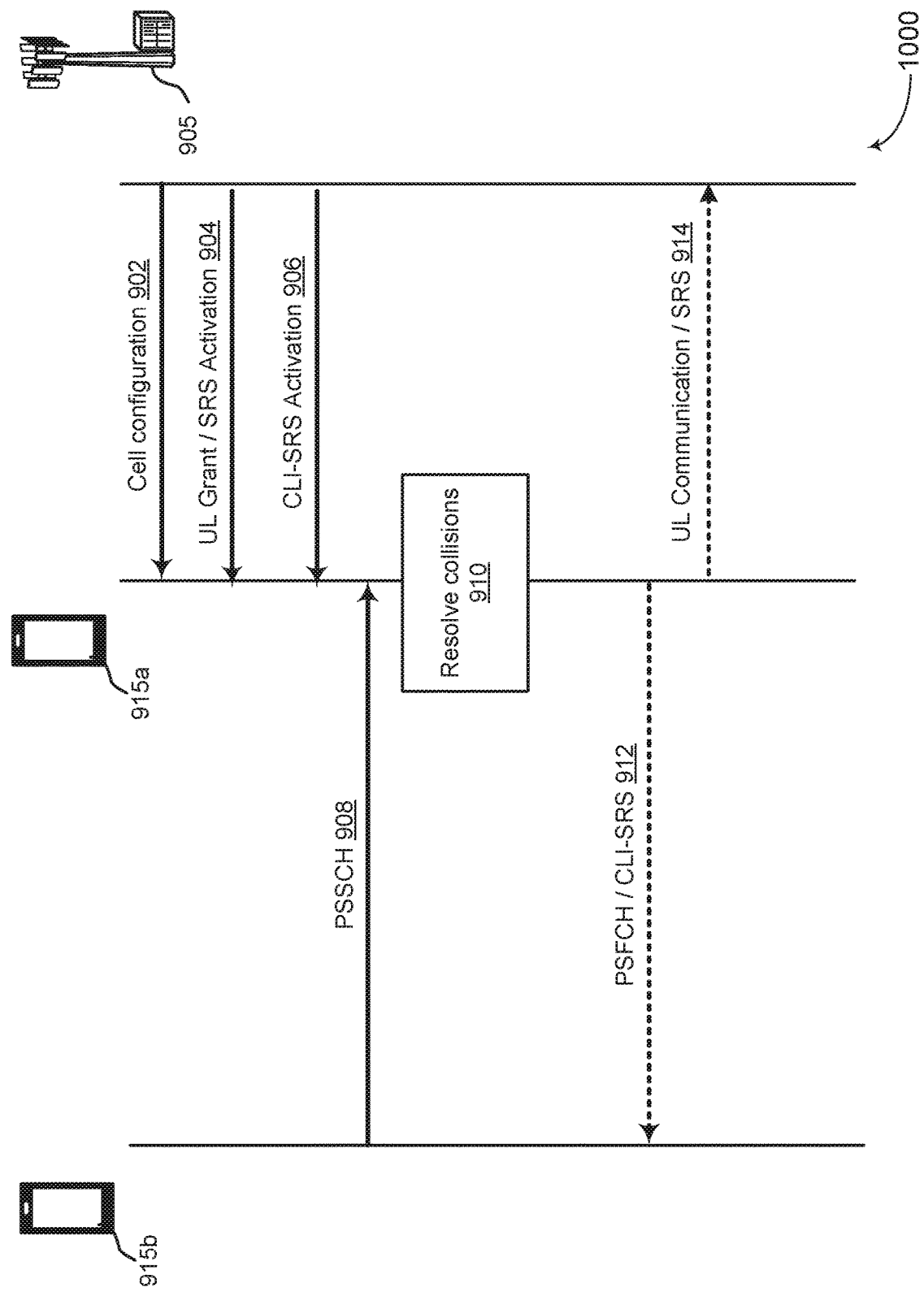
FIG. 9 is a signaling diagram of a wireless communication method based on a CLI-SRS prioritization configuration, according to some aspects of the present disclosure.

FIG. 9 is a signaling diagram illustrating a method 900 for handling collisions between a CLI-SRS and one or more other UL and/or SL communications scheduled for transmission, according to aspects of the present disclosure. The actions of FIG. 9 are performed by a first UE 915*a*, a second UE 915*b*, and a BS 905. The UEs 915 may be any of the UEs illustrated in FIG. 1A or 2, for example. In some aspects, one or more actions of FIG. 9 may be performed by a processor in a UE executing computer code to perform the functionality illustrated in FIG. 9. In the method 900 of FIG. 9, the first UE 915*a* may resolve collisions among scheduled UL communications, and collisions between UL and SL communications.

At action 902, the BS 905 transmits, and the first UE 915*a* receives, a cell configuration for at least a first cell. The cell configuration may be referred to as a CC configuration and/or a BWP configuration, in some aspects. The cell configuration may indicate, or be associated with, a CC and/or BWP. In some aspects, the cell configuration indicates a Uu BWP and a SL BWP. In some aspects, the Uu BWP and the SL BWP are associated with a same cell or CC. In other aspects, the Uu BWP and the SL BWP are associated with different cells or CCs.

At action 904, the BS 905 transmits, and the first UE 915*a* receives, at least one of a UL grant or an SRS activation signal associated with the Uu BWP. The UL grant may indicate time/frequency resources for a PUCCH and/or a PUSCH. In other aspects, action 904 may include receiving a DL communication signal. The DL communication signal may include DCI and/or DL data. The first UE 915*a* may be configured to transmit ACK/NACK for the DL data based on a HARQ protocol. In some aspects, communicating the SRS activation may include communicating DCI to dynamically trigger one or more aperiodic SRS occasions. In other aspects, communicating the SRS activation may include communicating a MAC-CE to activate a semi-persistent SRS resource set.

As discussed further below, the UL grant and/or SRS activation communicated at action 904 may trigger or indicate a communication by the first UE 915*a* for a set of time/frequency resources. In some aspects, the set of time/frequency resources indicated in the UL grant and/or SRS activation may indicate one or more time windows for the first UE 915*a* to transmit a UL communication and/or SRS. In another aspect, if the first UE 915*a* receives a DL signal at action 904, the UE 915*a* may be configured to transmit a response within the one or more time windows.

At action 906, the BS 905 transmits, and the first UE 915*a* receives, a CLI-SRS activation associated with the first cell. In some aspects, communicating the CLI-SRS activation may include communicating DCI to dynamically trigger one or more aperiodic CLI-SRS occasions. In other aspects, communicating the CLI-SRS activation may include communicating a MAC-CE to activate a semi-persistent CLI-SRS resource set. However, in some aspects, the method 900 may not include receiving a CLI-SRS activation. For example, the first UE 915*a* may be configured with a periodic CLI-SRS resource set which is activated based on the cell configuration received at action 902. The CLI-SRS resource sets may include periodic, semi-persistent, and/or aperiodic CLI-SRS resource sets. Accordingly, the UE 915*a* may apply the CLI-SRS resource set indicated for the serving cell.

At action 908, the second UE 915*b* transmits, and the first UE 915*a* receives, a SL communication. For example, the SL communication may include a PSSCH communication. In some aspects, the PSSCH may trigger the first UE 915*a* to transmit a SL feedback communication in a time window. For example, the PSSCH may trigger the first UE 915*a* to transmit a PSFCH communication in the time window.

In some aspects, the CLI-SRS resource set for the serving cell may include one or more CLI-SRS occasions occupying a set of time resources. In some instances, one or more of the CLI-SRS occasions may at least partially overlap in time with the UL communication associated with the UL grant of action 904 and/or the SL feedback communication associated with the SL communication of action 908. In some aspects, the one or more of the CLI-SRS occasions may also at least partially overlap in frequency with the UL communication and/or the SL communication. Accordingly, the first UE 915*a* may experience a scheduling conflict or collision for at least one time window between Uu communications as well as SL communications.

At action 910, the first UE 915*a* resolves the scheduling collisions for the time window. In the method 900, the first UE 915*a* may be configured to first resolve collisions of Uu communications scheduled for the Uu BWP, and then to resolve collisions between the Uu communication and any SL communications. Accordingly, the CLI-SRS priority configuration may include or indicate a priority of the CLI-SRS relative to other Uu communications and SL communications. In some aspects, the first UE 915*a* may use one or more aspects of the collision resolution of the method 700 described above to determine the prioritization of the Uu communications.

Referring to FIGS. 9 and 14, a collision resolution scheme may be used in a fourth full duplex communication scenario 1400. In some aspects, a cell configuration may provide for both Uu and SL communications. Accordingly, a UE may be configured to transmit and/or receive SL communications in at least a first portion of a CC, and to transmit and/or receive Uu communications in at least a second portion of the CC. For the purpose of the present disclosure, Uu communications transmitted by a UE may be referred to as UL communications. The scenario 1400 may occur in at least a first carrier including a Uu bandwidth part (BWP) and a SL BWP.

For example, the first UE 715*a* may receive a PSCCH and/or a PSSCH communication 1402 on the SL BWP. In some aspects, the PSCCH/PSSCH may indicate or trigger a sidelink feedback communication in a PSFCH resource 1408. The first UE 715*a* may also receive, on the Uu BWP, an activation signal 1404 activating or indicating a CLI-SRS resource 1412. As explained above, receiving the activation signal 1404 may include receiving a MAC-CE activating a semi-persistent CLI-SRS resource set. In another aspect, receiving the activation signal 1404 may include receiving a DCI indicating an aperiodic CLI-SRS resource or resource set. The first UE 715*a* may also receive, on the Uu BWP, a non CLI-SRS activation 1406 activating or indicating a non-CLI SRS resource 1410. In some aspects, the SRS resource 1410 may be a semi-persistent SRS resource or an aperiodic SRS resource.

The CLI-SRS resource 1412 collides or conflicts with the scheduled SRS resource 1410 in the Uu BWP, and with the scheduled PSFCH resource 1408 in the SL BWP. According to aspects of the present disclosure, action 910 may include resolving Uu collisions, and then resolving the SL collisions.

In some aspects, SL communications may be associated with a prioritization scheme. For example, SL communications may be ranked in priority from 1 to 8 based on the SL communication type. The priority of the SL communications may be based on the data or logical channel that the SL communication carries. In other aspects, Uu communications may be associated with a priority index of 0 or 1, where 1 indicates the highest priority. To determine the prioritization of Uu communications relative to SL communications, the CLI-SRS priority configuration may include or indicate one or more SL priority rank thresholds associated with the eight SL priority rank values to determine whether a Uu communication has a higher or lower priority than a SL communication.

For example, the CLI-SRS priority configuration may indicate a first threshold. The first threshold may correspond to one of the SL communication priority ranks. In some aspects, the SL priority rank 1 may be the highest priority, and the SL priority rank 8 may be the lowest priority. The first threshold may indicate that any SL communications above the threshold (i.e., lower priority index such as priority index 1, 2, etc.) have a higher priority than any Uu/UL communication. For example, the first threshold may indicate that the corresponding SL communications have a higher priority than URLLC Uu communications having a priority index of 1 as well as all other Uu communications having a priority index of 0. The CLI-SRS priority configuration may further indicate a second threshold. The second threshold may also correspond to one of the SL communication priority ranks. The second threshold may indicate that any SL communications above the second threshold have a higher priority than Uu communications having priority 0, but not Uu communications having priority 1. For example, the second threshold may indicate that SL communications between the first threshold and the second threshold have a higher priority than Uu communications having a priority index of 0, but not URLLC Uu communications having a priority index of 1. Further, SL communications that have a priority below the second threshold (i.e. higher priority index value such as priority index 7, 8, etc.) may have a lower priority than Uu communications having a priority index of 0 or 1.

At action 912, the first UE 915a transmits, and the second UE 915b receives, at least one of the PSFCH communication or the CLI-SRS. At action 914, the first UE 915a transmits, and the BS 905 receives, the UL communication or non-CLI SRS associated with action 904. In this regard, in some aspects, the first UE 915a may first resolve collisions of Uu communications. For example, referring to FIG. 14, the first UE 915a may resolve a conflict between the SRS and the CLI-SRS. In one example, the CLI-SRS is an aperiodic CLI-SRS, and the first UE 915a prioritizes the aperiodic CLI-SRS over the aperiodic SRS 1410. Accordingly, the first UE 915a may drop, or refrain from transmitting, the non-CLI SRS 1410 in the scheduled time window at action 914. In another example, the first UE 915a may prioritize, based on the CLI-SRS priority configuration, a non-CLI SRS or another UL communication over the CLI-SRS.

Once the Uu prioritization has been determined, the first UE 915a may determine the prioritization between any SL communications colliding with the remaining Uu communications. For example, referring to the example in FIG. 14, the first UE 915a may determine the priority of the PSFCH 1408 relative to the CLI-SRS 1412, if the CLI-SRS 1412 is prioritized over the non-CLI SRS 1412. If the CLI-SRS 1412 has a higher priority than the PSFCH 1408, then the first UE 915a may transmit the CLI-SRS 1412 and drop the PSFCH 1408. In another example, if the PSFCH 1408 is prioritized over the CLI-SRS 1412, then the first UE 915a may transmit the PSFCH 1408 and drop the CLI-SRS 1412.

In some aspects, the Uu BWP and SL BWP may be associated with different subcarrier spacings (SCSs). In some aspects, even if associated with the same CC, the Uu BWP and SL BWP may be associated with different SCSs. For example, the Uu BWP may be associated with a SCS of 15 kHz, and the SL BWP may be associated with an SCS of 30 kHz. In another example, the Uu BWP may be associated with a SCS of 60 kHz, and the SL BWP may be associated with a SCS of 30 kHz. In another example, the Uu BWP may be associated with a SCS of 30 kHz, and the SL BWP may be associated with an SCS of 15 kHz. CLI-SRS may be transmitted based on a Uu BWP or a SL BWP, in some aspects. In one aspect of the present disclosure, if the SCS of the Uu BWP is different from the SCS of the SL BWP, a time gap may be defined for transmission of the CLI-SRS on the SL BWP. FIG. 14 illustrates a time gap 1414 between the transmission of the PSFCH 1408 and the transmission of a CLI-SRS on the SL BWP.

As mentioned above, in some aspects, a CLI-SRS may be communicated in a Uu BWP or on a SL BWP. According to one aspect of the present disclosure, if the CLI-SRS is communicated on the Uu BWP, the priority of the CLI-SRS may be determined as a Uu communication. Accordingly, the prioritization of the CLI-SRS may first be determined with respect to other Uu communications using the techniques described above with respect to the method 700, and then the priority of the CLI-SRS with respect to any colliding SL communications may be determined as described above. In another aspect, if the CLI-SRS is communicated on the SL BWP, the priority of the CLI-SRS may be determined as a SL communication, such that any Uu collisions are first resolved, and then the priority of the CLI-SRS may be determined relative to the remaining Uu communications. In another aspect, the CLI-SRS priority may be treated as both a Uu and an SL communication. For example, in one aspect, the first UE 915a may determine the priority of the CLI-SRS based on whether the priority of the CLI-SRS would be higher if treated as a Uu communication or as a SL communication.

Figure 10:
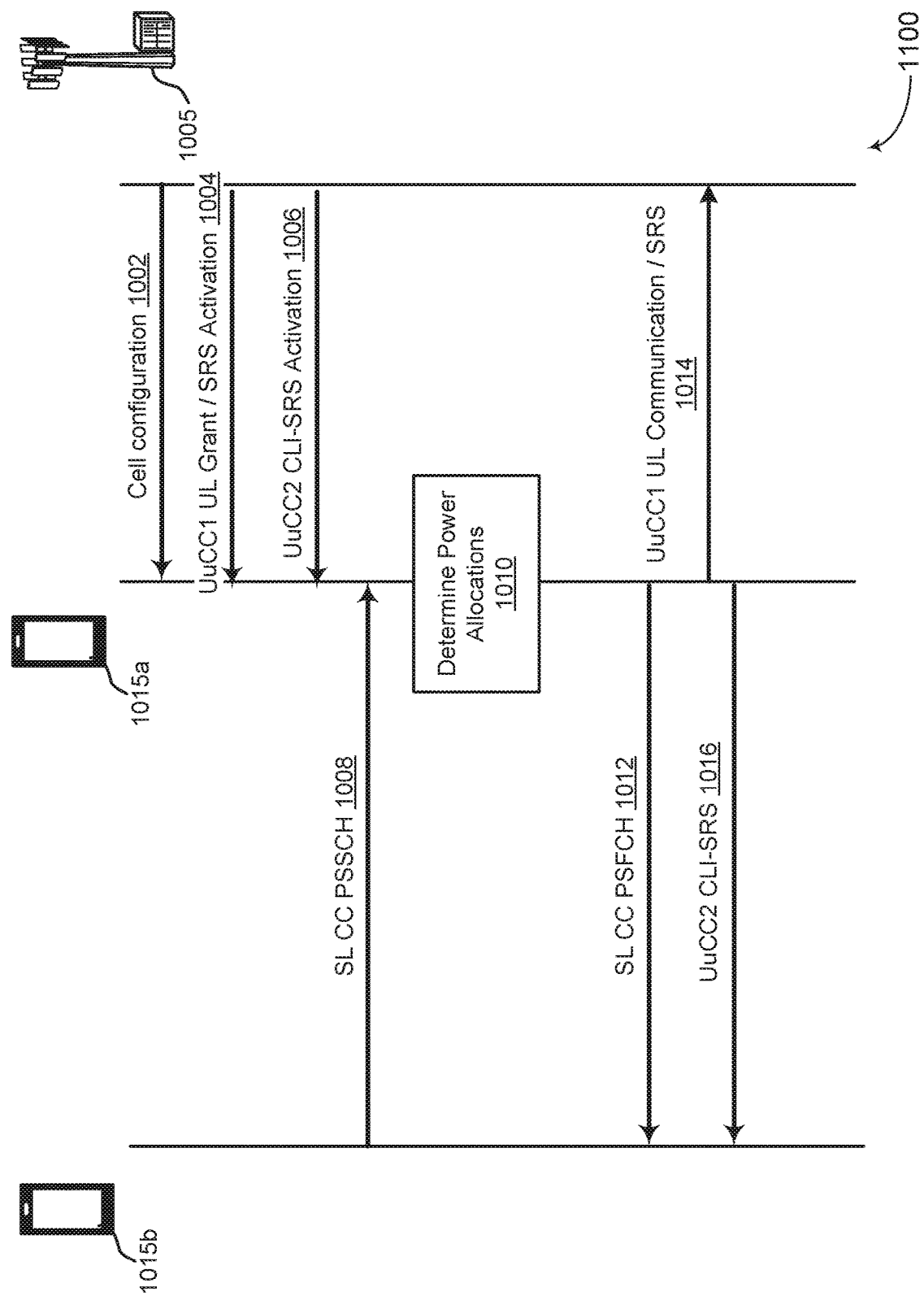
FIG. 10 is a signaling diagram of a wireless communication method based on a CLI-SRS power allocation priority configuration, according to some aspects of the present disclosure.

FIG. 10 is a signaling diagram illustrating a method 1000 for power allocation of CLI-SRS and one or more other UL and SL communications scheduled for transmission, according to aspects of the present disclosure. The actions of FIG. 10 are performed by a first UE 1015a, a second UE 1015b, and a BS 1005. The UEs 1015 may be any of the UEs illustrated in FIG. 1A or 2, for example. In some aspects, one or more actions of FIG. 10 may be performed by a processor in a UE executing computer code to perform the functionality illustrated in FIG. 10. One or more of the UEs 1015 may be configured for carrier aggregation (CA) in which the UEs 1015 are configured with two or more serving cells. Further, in the method 1000, one or more of the UEs may be configured to allocate power to Uu and SL communications simultaneously transmitted on different CCs.

At action 1002, the BS 1005 transmits, and the first UE 1015*a* receives, cell configurations for a first Uu cell (Uu CC1), a second Uu cell (Uu CC2), and a cell that includes at least one SL BWP (SL CC). It will be understood that the SL CC may also include one or more Uu BWPs. Further, in some aspects, the Uu CC1 may include a Uu BWP and a SL BWP. The cell configurations may be referred to as CC configurations and/or BWP configurations, in some aspects. The cell configuration may be associated with Uu communications and/or SL communications. The cell configurations may indicate UL, DL, and/or SL BWP configurations, measurements parameters, DL control channel monitoring configurations, timing advance parameters, beam management parameters, and/or any other suitable parameter or configuration associated with Uu CC1 and Uu CC2. The cells may include a Pcell, SpCell, Scell, and/or any other type of cell.

The cell configurations may each be associated with a serving cell index. In some aspects, the first UE 1015*a* may be configured with one or more CLI-SRS transmission resources and/or parameters. In this regard, a plurality of UEs operating in each cell Uu CC1, Uu CC2, SL CC may be configured with the same CLI-SRS transmission resource. Accordingly, the CLI-SRS transmission resources or configurations may be referred to as cell-level resources or configurations.

At action 1004, the BS 1005 transmits, and the first UE 1015*a* receives, at least one of a UL grant or an SRS activation signal associated with Uu CC1. The UL grant may indicate time/frequency resources on Uu CC1 for a PUCCH and/or a PUSCH. In other aspects, action 1004 may include receiving a DL communication signal. The DL communication signal may include DCI and/or DL data. The first UE 1015*a* may be configured to transmit ACK/NACK for the DL data based on a HARQ protocol. In some aspects, communicating the SRS activation may include communicating DCI to dynamically trigger one or more aperiodic SRS occasions. In other aspects, communicating the SRS activation may include communicating a MAC-CE to activate a semi-persistent SRS resource set.

As discussed further below, the UL grant and/or SRS activation communicated at action 1004 may trigger or indicate a communication by the first UE 1015*a* for a set of time/frequency resources on CC1, or on another cell. In some aspects, the set of time/frequency resources indicated in the UL grant and/or SRS activation may indicate one or more time windows for the first UE 1015*a* to transmit a UL communication and/or SRS. In another aspect, if the first UE 1015*a* receives a DL signal at action 1004, the UE 1015*a* may be configured to transmit a response within the one or more time windows.

At action 1006, the BS 1005 transmits, and the first UE 1015*a* receives, a CLI-SRS activation for one or more CLI-SRS resources on the second cell Uu CC2. In some aspects, communicating the CLI-SRS activation may include communicating DCI to dynamically trigger one or more aperiodic CLI-SRS occasions. In other aspects, communicating the CLI-SRS activation may include communicating a MAC-CE to activate a semi-persistent CLI-SRS resource set. However, in some aspects, the method 1000 may not include receiving a CLI-SRS activation. For example, the first UE 1015*a* may be configured with a periodic CLI-SRS resource set which is activated based on the cell configuration for Uu CC2 received at action 1002. For example, the first UE 1015*a* may be configured with a look-up table of CLI-SRS resource sets associated with each of a plurality of serving cells. The CLI-SRS resource sets may include periodic, semi-persistent, and/or aperiodic CLI-SRS resource sets. Accordingly, the UE 1015*a* may apply the CLI-SRS resource set indicated for Uu CC2.

At action 1008, the second UE 1015*b* transmits, and the first UE 1015*a* receives, a SL communication on the SL CC. In some aspects, the SL communication may include a PSCCH and/or a PSSCH communication. In some aspects, the SL communication may indicate or trigger a feedback SL communications. For example, the SL communication may indicate or trigger a PSFCH communication on the SL CC for a time window.

In some instances, one or more of the CLI-SRS occasions may at least partially overlap in time with one or more other UL communications and/or SL communications, although scheduled for different cells. An example of an overlapping timing configuration is illustrated in FIG. 16. As shown in FIG. 16, the UE may be configured, on Uu CC1, with a periodic SRS resource 1602. Further, the UE may receive a CLI-SRS activation 1606 on the Uu CC2 activating a CLI-SRS resource for at least one CLI-SRS transmission 1608 on Uu CC2. Further, the UE may have a SL communication scheduled on the SL CC. In some aspects, the SL communication may include a PSFCH communication 1604 responding to a PSCCH and/or PSSCH communication. In the illustrated example, the CLI-SRS 1608 collides in time with the non-CLI SRS 1602 and the PSFCH 1604. However, the CLI-SRS 1608, SRS 1602, and PSFCH 1604 may be scheduled on different CCs or frequency resources such that they may be communicated simultaneously.

Although scheduled for different cells, the UE 1015*a* may be subject to transmission power limitations or rules for the simultaneous transmissions of the CLI-SRS 1608, the non-CLI SRS 1602, and the PSFCH 1604. For example, the first UE 1015*a* may be limited to a transmit power of P_cmax for simultaneous transmissions within a frequency range. Accordingly, the first UE 1015*a* may be configured to allocate power to UL and/or SL transmissions based on a power allocation prioritization.

At action 1010, the first UE 1015*a* determines a power allocation for the CLI-SRS on CC2, the UL communication on CC1, and the SL communication on SL CC based on a CLI-SRS power allocation priority configuration. According to aspects of the present disclosure, the first UE 1015*a* may be configured with a CLI-SRS power allocation priority configuration. In some aspects, the CLI-SRS priority configuration may include or indicate the CLI-SRS power allocation priority configuration. For example, the CLI-SRS power allocation priority configuration may include or indicate a priority ranking of CLI-SRS with respect to other UL/SL communications. For example, the CLI-SRS power allocation priority configuration may indicate the power allocation priorities of a plurality of UL communications, including CLI-SRS communications. In some aspects, the CLI-SRS power allocation priority configuration may be similar or identical to the CLI-SRS power allocation priority configuration described above with respect to the method 800.

In some aspects, the first UE 1015*a* may determine the power allocation prioritization of Uu and SL communications based on section 16.2.4 of 3GPP Specification TS 38.213 v16.8.0, the entirety of which is hereby incorporated by reference. As mentioned above, in some aspects, a CLI-SRS may be communicated in a Uu BWP or on a SL BWP. According to one aspect of the present disclosure, if the CLI-SRS is communicated on the Uu BWP, the power allocation prioritization of the CLI-SRS may be determined as a Uu communication. According to another aspect of the present disclosure, if the CLI-SRS is communicated on the SL BWP, the power allocation prioritization of the CLI-SRS may be determined as a SL communication. In another aspect, the CLI-SRS power allocation prioritization may be treated as both a Uu and an SL communication. For example, in one aspect, the first UE 915*a* may determine the power allocation prioritization of the CLI-SRS based on whether the power allocation prioritization of the CLI-SRS would be higher if treated as a Uu communication or as a SL communication.

Figure 17:
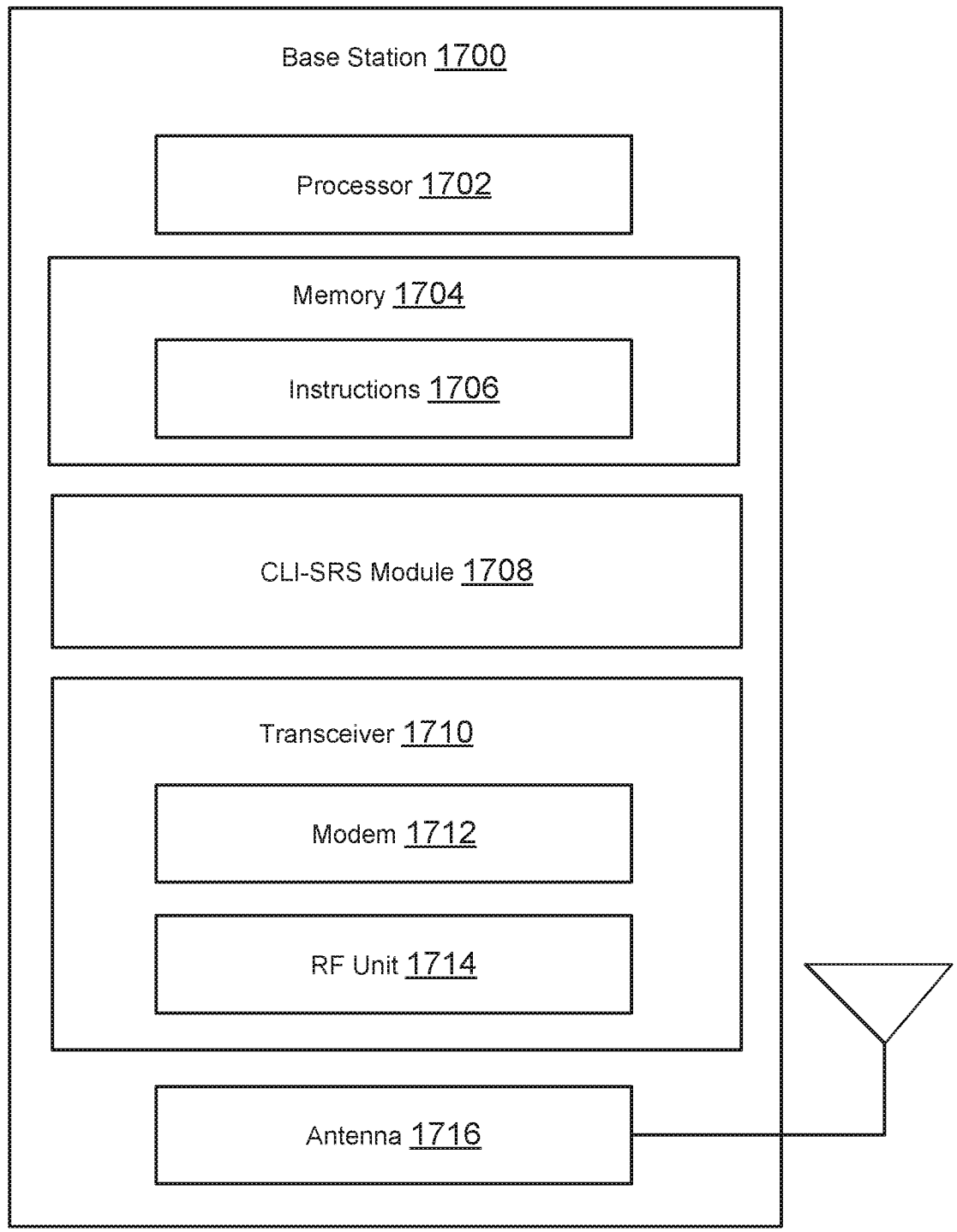
FIG. 17 is a block diagram of an exemplary base station (BS) according to some aspects of the present disclosure.

FIG. 17 is a block diagram of an exemplary BS 1700 according to some aspects of the present disclosure. The BS 1700 may be a BS 105 in the network 100 as discussed above in FIG. 1A, and/or one of the BSs 707, 805, 905, 1005 described above in FIGS. 7-10. A shown, the BS 1700 may include a processor 1702, a memory 1704, a transceiver 1710 including a modem subsystem 1712 and a RF unit 1714, and one or more antennas 1716. These elements may be in direct or indirect communication with each other, for example via one or more buses.

The processor 1702 may have various features as a specific-type processor. For example, these may include a CPU, a DSP, an ASIC, a controller, a FPGA device, another hardware device, a firmware device, or any combination thereof configured to perform the operations described herein. The processor 1702 may also be implemented as a combination of computing devices, e.g., a combination of a DSP and a microprocessor, a plurality of microprocessors, one or more microprocessors in conjunction with a DSP core, or any other such configuration.

The memory 1704 may include a cache memory (e.g., a cache memory of the processor 1702), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some aspects, the memory 1704 may include a non-transitory computer-readable medium. The memory 1704 may store instructions 1706. The instructions 1706 may include instructions that, when executed by the processor 1702, cause the processor 1702 to cause the other components of the base station 1700 to communicate with the UE 1800, such as by transmitting configurations and the like, and actions described with respect to FIGS. 7-10. Instructions 1706 may also be referred to as code, which may be interpreted broadly to include any type of computer-readable statement(s) as discussed below with respect to FIG. 19.

In some aspects, the CLI-SRS module 1708 may be configured to facilitate the measurement of CLI. For example, the CLI-SRS module 1708 may be configured to cause the transceiver 1710 to transmit, to one or more UEs a CLI-SRS priority configuration. In other aspects, the CLI-SRS module 1708 may be configured to activate, for one or more UEs, CLI-SRS resources and/or other DL, UL, and/or other communication resources to prevent or resolve potential collisions or scheduling conflicts between CLI-SRS resources and the other UL/DL/SL resources. In some aspects, the CLI-SRS priority configuration may be based on or associated with a cell configuration. Accordingly, in some aspects, the CLI-SRS may be associated with CLI-SRS resources configured for a plurality of wireless communication devices in a cell. In some aspects, the CLI-SRS priority configuration may be associated with one or more CLI-SRS prioritization rules for resolving conflicts and/or for allocating power for simultaneous Uu and/or SL communications, as described above with respect to the methods 700-1000 and the scenarios 1100-1600. In some aspects, the CLI-SRS module 1708 may be configured to perform one or more steps, actions, and/or other aspects of the method 2000 shown in FIG. 20.

As shown, the transceiver 1710 may include the modem subsystem 1712 and the RF unit 1714. The transceiver 1710 can be configured to communicate bi-directionally with other devices, such as the UEs 115 and/or another core network element. The modem subsystem 1712 may be configured to modulate and/or encode data according to a MCS, e.g., a LDPC coding scheme, a turbo coding scheme, a convolutional coding scheme, a digital beamforming scheme, etc. The RF unit 1714 may be configured to process (e.g., perform analog to digital conversion or digital to analog conversion, etc.) modulated/encoded data (e.g., SSBs, RMSI, MIB, SIB, frame based equipment—FBE configuration, PRACH configuration PDCCH, PDSCH) from the modem subsystem 1712 (on outbound transmissions) or of transmissions originating from another source such as a UE 115, the node 315, and/or BS 1700. The RF unit 1714 may be further configured to perform analog beamforming in conjunction with the digital beamforming. Although shown as integrated together in transceiver 1710, the modem subsystem 1712 and/or the RF unit 1714 may be separate devices that are coupled together at the BS 105 to enable the BS 105 to communicate with other devices.

The RF unit 1714 may provide the modulated and/or processed data, e.g. data packets (or, more generally, data messages that may contain one or more data packets and other information), to the antennas 1716 for transmission to one or more other devices. The antennas 1716 may be similar to the antennas of the BS 105 discussed above. This may include, for example, transmission of information to complete attachment to a network and communication with a camped UE 115 according to some aspects of the present disclosure. The antennas 1716 may further receive data messages transmitted from other devices and provide the received data messages for processing and/or demodulation at the transceiver 1710. The transceiver 1710 may provide the demodulated and decoded data (e.g., PUCCH control information, PRACH signals, PUSCH data) to the processor 1702 for processing. The antennas 1716 may include multiple antennas of similar or different designs in order to sustain multiple transmission links.

In an aspect, the BS 1700 can include multiple transceivers 1710 implementing different RATs (e.g., NR and LTE). In an aspect, the BS 1700 can include a single transceiver 1710 implementing multiple RATs (e.g., NR and LTE). In an aspect, the transceiver 1710 can include various components, where different combinations of components can implement different RATs.

Figure 18:
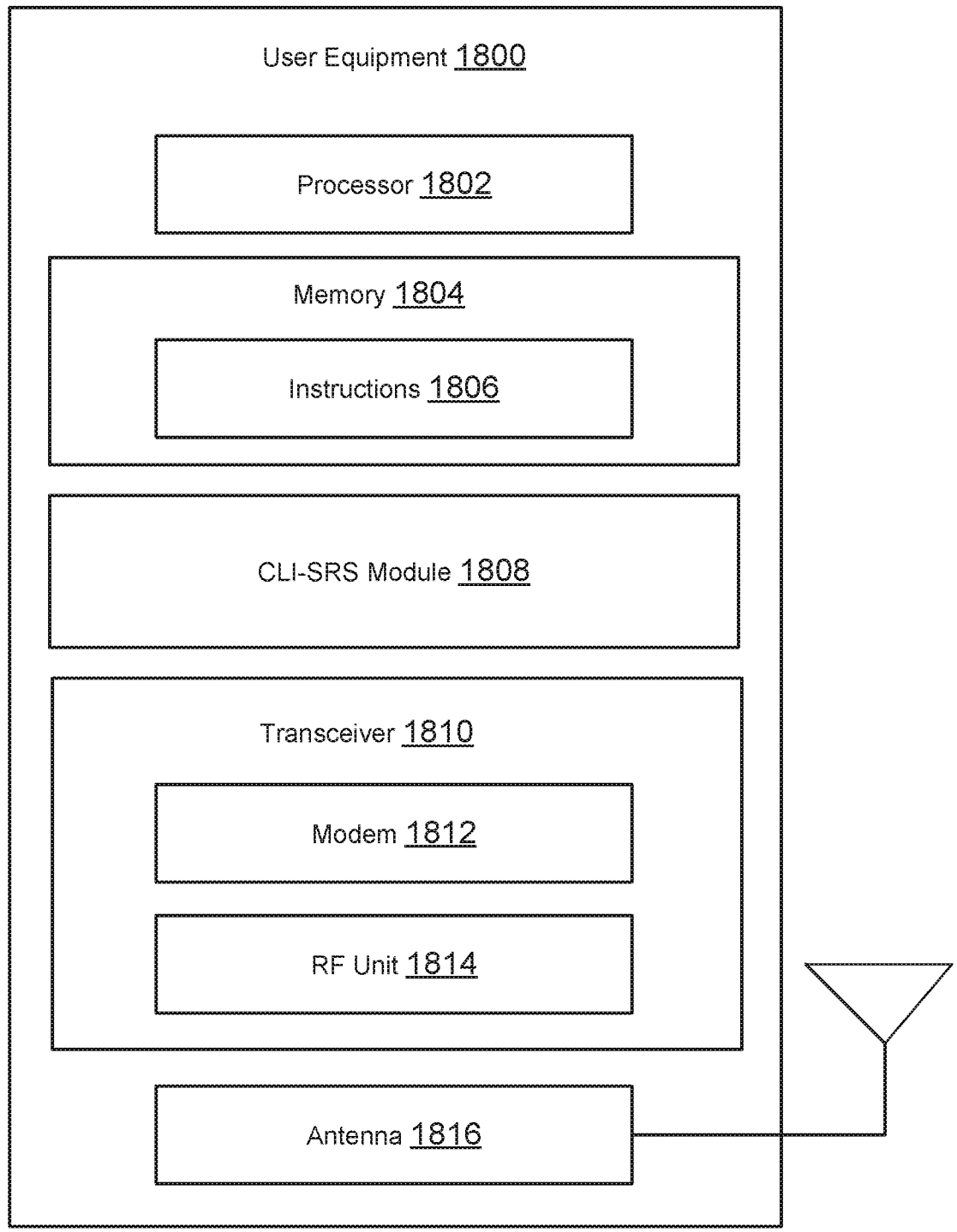
FIG. 18 is a block diagram of a user equipment (UE) according to some aspects of the present disclosure.

FIG. 18 is a block diagram of an exemplary UE 1800 according to some aspects of the present disclosure. The UE 1800 may be a UE 115 or UE 215 as discussed above in FIGS. 7-10. As shown, the UE 1800 may include a processor 1802, a memory 1804, a CLI-SRS module 1808, a transceiver 1810 including a modem subsystem 1812 and a radio frequency (RF) unit 1814, and one or more antennas 1816. These elements may be coupled with one another. The term "coupled" may refer to directly or indirectly coupled or connected to one or more intervening elements. For instance, these elements may be in direct or indirect communication with each other, for example via one or more buses.

The processor 1802 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 1802 may also be implemented as a combination of computing devices, e.g., a combination of a DSP and a microprocessor, a plurality of microprocessors, one or more microprocessors in conjunction with a DSP core, or any other such configuration. The processor 1802 may correspond to the application processor (AP) discussed above, upon which OS 311 (and HLOS 911) runs.

The memory 1804 may include a cache memory (e.g., a cache memory of the processor 1802), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 1804 includes a non-transitory computer-readable medium. The memory 1804 may store, or have recorded thereon, instructions 1806. The instructions 1806 may include instructions that, when executed by the processor 1802, cause the processor 1802 to perform the operations described herein with reference to a UE 115 in connection with aspects of the present disclosure, for example, aspects of FIGS. 7-10. Instructions 1806 may also be referred to as code. Code may include any type of computer-readable statements.

The CLI-SRS module 1808 may be implemented via hardware, software, or combinations thereof. For example, the CLI-SRS module 1808 may be implemented as a processor, circuit, and/or instructions 1806 stored in the memory 1804 and executed by the processor 1802.

In some aspects, the CLI-SRS module 1808 may be configured to transmit and/or receive SRS to facilitate the measurement of CLI. For example, the CLI-SRS module 1808 may be configured to cause the transceiver 1810 to transmit, to one or more other UEs and/or to one or more BSs, a CLI-SRS. In some aspects, the CLI-SRS may be similar or identical to a non-CLI SRS. In some aspects, the CLI-SRS may be based on or associated with a cell configuration. Accordingly, in some aspects, the CLI-SRS may be associated with CLI-SRS resources configured for a plurality of wireless communication devices in a cell.

In another aspect of the present disclosure, the CLI-SRS module 1808 may be configured to communicate CLI-SRS based on a CLI-SRS timing or time configuration. In some aspects, the CLI-SRS time configuration may be periodic, semi-persistent, or aperiodic. In some aspects, the CLI-SRS module 1808 may be configured to communicate CLI-SRS based on a CLI-SRS priority configuration. In some aspects, the CLI-SRS priority configuration may be statically configured or hard coded at the UE 1800. In other aspects, the CLI-SRS priority configuration may be RRC configured. In some aspects, the CLI-SRS priority configuration may be associated with one or more CLI-SRS prioritization rules for resolving conflicts and/or for allocating power for simultaneous Uu and/or SL communications, as described above with respect to the methods 700-1000 and the scenarios 1100-1600.

As shown, the transceiver 1810 may include the modem subsystem 1812 and the RF unit 1814. The transceiver 1810 can be configured to communicate bi-directionally with other devices, such as the BSs 105 and 1700.

The modem subsystem 1812 may be configured to modulate and/or encode the data from the memory 1804 and the CLI-SRS module 1808 according to a modulation and coding scheme (MCS), e.g., a low-density parity check (LDPC) coding scheme, a turbo coding scheme, a convolutional coding scheme, a digital beamforming scheme, etc. The RF unit 1814 may be configured to process (e.g., perform analog to digital conversion or digital to analog conversion, etc.) modulated/encoded data (e.g., PUSCH data, PUCCH UCI, MSG1, MSG3, etc.) or of transmissions originating from another source such as a UE 115, a BS 185, or an anchor. The RF unit 1814 may be further configured to perform analog beamforming in conjunction with the digital beamforming. Although shown as integrated together in transceiver 1810, the modem subsystem 1812 and the RF unit 1814 may be separate devices that are coupled together at the UE 1800 to enable the UE 1800 to communicate with other devices.

The RF unit 1814 may provide the modulated and/or processed data, e.g. data packets (or, more generally, data messages that may contain one or more data packets and other information), to the antennas 1816 for transmission to one or more other devices. The antennas 1816 may further receive data messages transmitted from other devices. The antennas 1816 may provide the received data messages for processing and/or demodulation at the transceiver 1810. The transceiver 1810 may provide the demodulated and decoded data (e.g., RRC configurations, MIB, PDSCH data and/or PDCCH DCIs, etc.) to the CLI-SRS module 1808 for processing. The antennas 1816 may include multiple antennas of similar or different designs in order to sustain multiple transmission links.

In an aspect, the UE 1800 can include multiple transceivers 1810 implementing different RATs (e.g., NR and LTE). In an aspect, the UE 1800 can include a single transceiver 1810 implementing multiple RATs (e.g., NR and LTE). In an aspect, the transceiver 1810 can include various components, where different combinations of components can implement different RATs.

Figure 19:
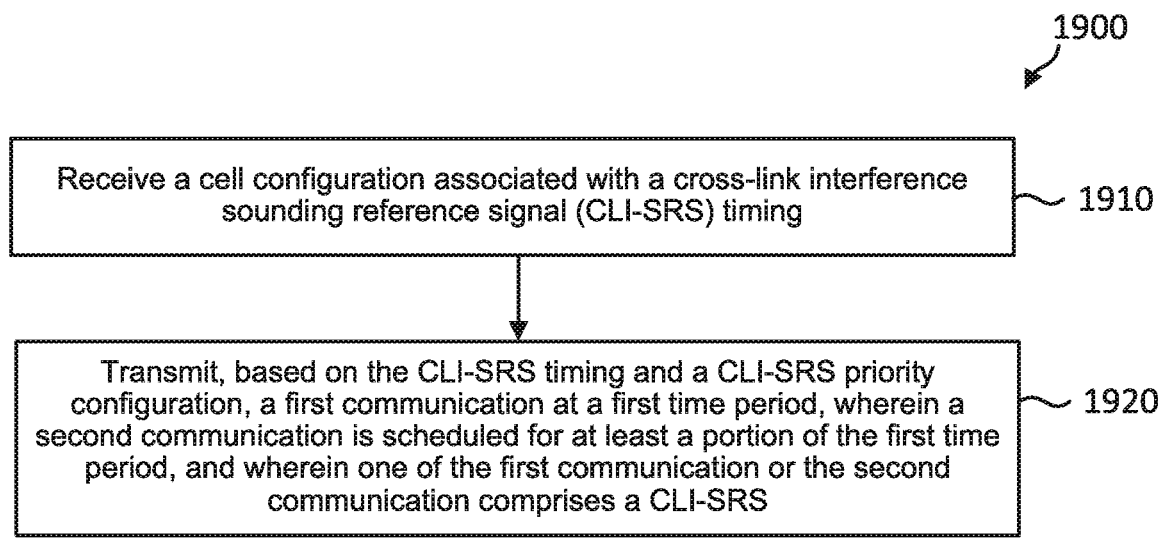
FIG. 19 is a flow diagram of a wireless communication method according to some aspects of the present disclosure.

FIG. 19 is a flow diagram of a method 1900 for communicating CLI-SRS based on a CLI-SRS priority configuration, according to aspects of the present disclosure. The steps, actions, or aspects of the method 1900 may be performed by a UE, such as the UE 1800 and/or one of the UEs 115 and/or 215 of the networks 100, 200, respectively. In some aspects, the UE 1800 may use one or more components to perform the actions of the method 1900, such as the processor 1802, the memory 1804, the CLI-SRS module 1808, the transceiver 1810, and/or one or more antennas 1816.

At action 1910, the UE receives a cell configuration associated with a cross-link interference sounding reference signal (CLI-SRS) timing or time configuration. The cell configuration may be referred to as a CC configuration and/or a BWP configuration, in some aspects. The cell configuration may include one or more RRC configurations, for example. Accordingly, receiving the cell configuration may include receiving one or more RRC information elements (IEs). In some aspects, the cell configuration may indicate, or be associated with, a CC and/or BWP. The cell configuration may include or indicate a Uu BWP and/or a SL BWP. The cell configuration may indicate UL, DL, and/or SL BWP configurations, measurements parameters, DL control channel monitoring configurations, timing advance parameters, beam management parameters, and/or any other suitable parameter or configuration associated with the first cell. The first cell may be a primary cell (Pcell), a special cell (SpCell), a secondary cell (Scell), and/or any suitable type of cell. In some aspects, receiving the cell configuration include communicating more than one cell configuration associated with more than one serving cell. For example, the UE may be configured to operate in a carrier aggregation (CA) mode in which the UE may communicate with more than one serving cell. For example, the UE may receive cell configurations for a Pcell and at least one Scell. In some aspects, action 1910 includes receiving a first RRC IE indicating a Uu BWP configuration, and a second RRC IE indicating a SL BWP or frequency resource configuration. In some aspects, the RRC IEs may be associated with a same set of frequency resources. Accordingly, in some aspects, the RRC IEs, and thus the Uu BWP and the SL BWP, may be associated with a same CLI-SRS timing configuration and/or CLI-SRS priority configuration, as explained further below.

The cell configuration may be associated with a serving cell index. In some aspects, the UE may be configured with one or more CLI-SRS transmission resources and/or parameters. In this regard, a plurality of UEs operating in the cell may be configured with the same CLI-SRS transmission resource. Accordingly, the CLI-SRS transmission resources or configurations may be referred to as cell-level resources or configurations. Each CLI-SRS transmission resource may be associated with a serving cell index.

At action 1920, the UE transmits, based on the CLI-SRS timing and a CLI-SRS priority configuration, a first communication at a first time period. In some aspects, a second communication is scheduled for at least a portion of the first time period. In some aspects, one of the first communication or the second communication comprises a CLI-SRS. In some aspects, transmitting the first communication comprises transmitting a CLI-SRS. In some aspects, the transmission of the CLI-SRS may be based on the CLI-SRS activation activating semi-persistent or aperiodic resources. In other aspects, the CLI-SRS transmission may be based on a periodic configured set of CLI-SRS resources. The CLI-SRS may be transmitted during a CLI-SRS measurement window configured for one or more other UEs in the network.

In some aspects, the CLI-SRS priority configuration may indicate one or more of the rules described above. In other aspects, the CLI-SRS priority configuration may indicate a priority of a CLI-SRS relative to other CLI-SRSs and/or other UL/SL communications. In other aspects, the CLI-SRS priority configuration may indicate a priority value or rank of each type of communication, including aperiodic CLI-SRS, semi-persistent CLI-SRS, periodic CLI-SRS, non-CLI SRS, PUCCH, PUSCH, PSSCH, PSCCH, PSFCH, and/or any other type of UL or SL communication.

In some aspects, action 1920 may include determining a prioritization of a CLI-SRS transmission relative to one or more other UL and/or SL communications. For example, the UE may apply one or more CLI-SRS priority rules or configurations to resolve conflicts with CLI-SRS resources and other SL and/or UL resources or scheduled communications, as described above with respect to FIGS. 7-16. In some aspects, resolving the conflicting or colliding resources may involve refraining from transmitting one communication and proceeding to transmit the other. In other aspects, resolving the conflicting resources may involve dropping one or more overlapping symbols from at least one of the communications.

A CLI-SRS priority configuration may refer to one or more rules or protocols carried out by a UE and/or the BS to resolve and/or prevent collisions of CLI-SRS resources with other UL/SL resources. In some aspects, the CLI-SRS priority configuration may be a static or hard coded configuration. Further, in some aspects, the CLI-SRS priority configuration may include a hard coded BS configuration which may prevent activating or configuring UL/SL resources that would collide with a CLI-SRS resource, and/or may prevent activating or configuring CLI-SRS resources that would collide with another UL/SL resource.

In some aspects, the UE may drop either the CLI-SRS or one or more coinciding UL/SL scheduled resources. For example, the UE may determine which of the CLI-SRS or the coinciding UL/SL communication is associated with a higher priority. Thus, the UE may transmit either the CLI-SRS or the coinciding UL/SL communication based on a comparison of the priority of the CLI-SRS and a priority of the coinciding UL/SL communication. In other aspects, the priority of the CLI-SRS with respect to other UL/SL communications may depend on the time configuration and/or type of the UL/SL communication. In some aspects, the priority of the CLI-SRS may be based on the time configuration of the CLI-SRS. For example, the priority of the CLI-SRS with respect to other UL/SL communications may be based on whether the CLI-SRS resources are periodic, semi-persistent, or aperiodic. In some aspects, the priority of the CLI-SRS with respect to another UL/SL communication may be based on whether the other UL/SL communication includes a PUCCH communication, a PUSCH communication, a PSCCH communication, a PSSCH communication, a PSFCH communication, and/or a non-CLI SRS.

In one example, the UE may be configured to drop, or refrain from transmitting, at least a portion of the CLI-SRS if the CLI-SRS collides with a PUSCH with a priority index 0. In another aspect, the UE may be configured to drop, or refrain from transmitting, at least a portion of the CLI-SRS if the CLI-SRS collides with a PUSCH with a priority index 1. In some aspects, if the CLI-SRS resources are semi-persistent or periodic, the UE may be configured to refrain from transmitting at least a portion of the CLI-SRS if the CLI-SRS collides with a PUCCH carrying channel state information (CSI) reports, RSRP reports, and/or SINR reports. In some aspects, the UE may be configured to refrain from transmitting at least a portion of the CLI-SRS if the CLI-SRS collides with a PUCCH carrying HARQ-ACK information, a link recovery request, and/or a scheduling request. In some aspects, if the CLI-SRS resources are aperiodic, the UE may be configured to refrain from transmitting at least a portion of a PUCCH carrying CSI reports, RSRP reports, and/or SINR reports, if the CLI-SRS collides with the PUCCH. In another aspect, the UE may be configured to refrain from transmitting at least a portion of a periodic or semi-persistent CLI-SRS if the CLI-SRS collides with an aperiodic non-CLI SRS. In another aspect, the UE may be configured to refrain from transmitting at least a portion of a non-CLI SRS if a CLI-SRS collides with the non-CLI SRS. In another aspect, the UE may be configured to refrain from transmitting at least a portion of a periodic or semi-persistent non-CLI SRS if an aperiodic CLI-SRS collides with the non-CLI SRS.

In some aspects, the UE may be configured to refrain from transmitting a dynamic PUSCH with priority 0 if the dynamic PUSCH would collide with an aperiodic CLI-SRS. In another aspect, the UE may be configured to refrain from transmitting a SPS PUSCH if the SPS PUSCH would collide with an aperiodic CLI-SRS. In another aspect, the UE may be configured to refrain from transmitting a CLI-SRS if the CLI-SRS would collide with a PUCCH carrying a scheduling request, HARQ response, and/or a link recovery request. In another aspect, if an aperiodic CLI-SRS would collide with a configured grant (CG) PUSCH, the UE may be configured to drop the CG-PUSCH and transmit the CLI-SRS.

In other aspects, the UE may be configured to drop one or more overlapping symbols of a CLI-SRS or another UL/SL communication. For example, in some aspects, if a PUSCH and/or a PUCCH having a priority of 1 overlaps with a CLI-SRS resource, the UE may drop the overlapping symbols of the CLI-SRS. In another aspect, if an aperiodic CLI-SRS would collide with a periodic or semi-persistent SRS, the UE may drop the overlapping symbols of the periodic or semi-persistent SRS. In another aspect, if an aperiodic CLI-SRS would collide with a periodic or semi-persistent CLI-SRS, the UE may drop the overlapping symbols of the periodic or semi-persistent CLI-SRS. In another aspect, if an aperiodic SRS would collide with a semi-persistent or periodic CLI-SRS, the UE may drop the overlapping symbols of the CLI-SRS. In another aspect, if a semi-persistent CLI-SRS would collide with a periodic SRS, the UE may be configured to drop the overlapping symbols of the periodic SRS. In another aspect, if a semi-persistent CLI-SRS would collide with a periodic CLI-SRS, the UE may be configured to drop the overlapping symbols of the periodic CLI-SRS.

In some aspects, the CLI-SRS priority configuration may indicate one or more of the rules described above. In other aspects, the CLI-SRS priority configuration may indicate a priority of a CLI-SRS relative to other CLI-SRSs and/or other UL/SL communications. In other aspects, the CLI-SRS priority configuration may indicate a priority value or rank of each type of communication, including aperiodic CLI-SRS, semi-persistent CLI-SRS, periodic CLI-SRS, non-CLI SRS, PUCCH, PUSCH, PSSCH, PSCCH, PSFCH, and/or any other type of UL or SL communication.

In another aspect of the present disclosure, the method 1900 may include transmitting the second communication and/or a different communication simultaneously based on a CLI-SRS power allocation priority configuration. For example, the UE may be configured with a CLI-SRS power allocation priority configuration. In some aspects, the CLI-SRS priority configuration may include or indicate the CLI-SRS power allocation priority configuration. For example, the CLI-SRS power allocation priority configuration may include or indicate a priority ranking of CLI-SRS with respect to other UL/SL communications. For example, the CLI-SRS power allocation priority configuration may indicate the power allocation priorities of a plurality of UL communications, including CLI-SRS communications.

In some aspects, CLI-SRS transmissions may be ranked relative to other UL communications. Further, CLI-SRS transmissions of one timing type (e.g., aperiodic, semi-persistent) may be prioritized relative to other CLI-SRS transmissions of another timing type (e.g., semi-persistent, periodic). Non-CLI SRS transmissions may be similarly prioritized based on timing type. In other aspects, CLI-SRS may be ranked equally with non-CLI SRS. In other aspects, CLI-SRS may be ranked lower than non-CLI SRS. In some aspects, aperiodic CLI-SRS may have a different priority rank relative to other UL communications than semi-persistent and/or periodic CLI-SRS. For example, in some aspects, aperiodic CLI-SRS may have a higher power allocation priority ranking compared to PUSCH that does not carry UCI and/or CSI.

Figure 20:
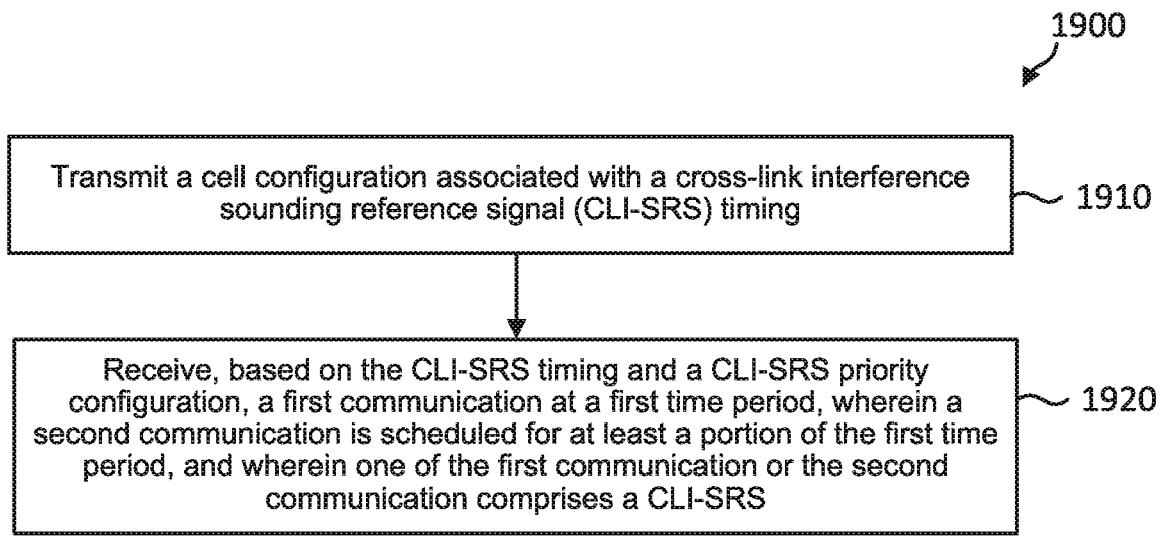
FIG. 20 is a flow diagram of a wireless communication method according to some aspects of the present disclosure.

FIG. 20 is a flow diagram of a method 2000 for communicating CLI-SRS based on a CLI-SRS priority configuration, according to aspects of the present disclosure. The steps, actions, or aspects of the method 2000 may be performed by a BS, such as the BS 1700 and/or one of the BSs 105 and/or 205 of the networks 100, 200, respectively. In some aspects, the BS 1700 may use one or more components to perform the actions of the method 2000, such as the processor 1702, the memory 1704, the CLI-SRS module 1708, the transceiver 1710, and/or one or more antennas 1716.

At action 2010, the BS transmits, to a UE, a cell configuration associated with a cross-link interference sounding reference signal (CLI-SRS) timing or time configuration. The cell configuration may be referred to as a CC configuration and/or a BWP configuration, in some aspects. The cell configuration may include one or more RRC configurations, for example. Accordingly, receiving the cell configuration may include receiving one or more RRC information elements (IEs). In some aspects, the cell configuration may indicate, or be associated with, a CC and/or BWP. The cell configuration may include or indicate a Uu BWP. In some aspects, the cell may also be associated with a SL BWP. In some aspects, action 2010 includes transmitting a first RRC IE including or indicating the CC configuration, and a second RRC IE indicating the SL BWP configuration. The cell or frequency resource configurations may indicate UL, DL, and/or SL BWP configurations, measurements parameters, DL control channel monitoring configurations, timing advance parameters, beam management parameters, and/or any other suitable parameter or configuration associated with the first cell. The first cell may be a primary cell (Pcell), a special cell (SpCell), a secondary cell (Scell), and/or any suitable type of cell. In some aspects, receiving the cell configuration include communicating more than one cell configuration associated with more than one serving cell. For example, the UE may be configured to operate in a carrier aggregation (CA) mode in which the UE may communicate with more than one serving cell. For example, the UE may receive cell configurations for a Pcell and at least one Scell.

The cell configuration may be associated with a serving cell index. In some aspects, the UE may be configured with one or more CLI-SRS transmission resources and/or parameters. In this regard, a plurality of UEs operating in the cell may be configured with the same CLI-SRS transmission resource. Accordingly, the CLI-SRS transmission resources or configurations may be referred to as cell-level resources or configurations. Each CLI-SRS transmission resource may be associated with a serving cell index.

At action 2020, the BS receives, based on the CLI-SRS timing and a CLI-SRS priority configuration, a first communication at a first time period. In some aspects, a second communication is scheduled for at least a portion of the first time period. In some aspects, one of the first communication or the second communication comprises a CLI-SRS. In some aspects, receiving the first communication comprises receiving a UL communication from a UE. In some aspects, the method 2000 further includes transmitting, to the UE, a DL communication indicating a grant for the UL communication. In some aspects, the second communication may be a CLI-SRS. The CLI-SRS may be periodic, semi-persistent, or aperiodic. The CLI-SRS priority configuration may indicate that the first communication is associated with a greater priority than the second communication. For example, the CLI-SRS priority configuration may indicate that a scheduled UL communication has a higher priority than an overlapping CLI-SRS, such that the CLI-SRS is dropped by the UE. In another aspect, the UE may truncate or drop only the overlapping symbols of the CLI-SRS.

In some aspects, the CLI-SRS priority configuration may indicate one or more of the rules described above. In other aspects, the CLI-SRS priority configuration may indicate a priority of a CLI-SRS relative to other CLI-SRSs and/or other UL/SL communications. In other aspects, the CLI-SRS priority configuration may indicate a priority value or rank of each type of communication, including aperiodic CLI-SRS, semi-persistent CLI-SRS, periodic CLI-SRS, non-CLI SRS, PUCCH, PUSCH, PSSCH, PSCCH, PSFCH, and/or any other type of UL or SL communication. In some aspects, at least one of the first communication or the second communication may include a CLI-SRS measurement report based on a CLI-SRS measured by a UE.

In some aspects, the method 2000 may include steps, actions, and/or other aspects corresponding to those of the method 1900. For example, in some aspects, the method 2000 may be complementary to the method 1900.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular implementations illustrated and described herein, as they are merely by way of some examples thereof, but rather, should be fully commensurate with that of the claims appended hereafter and their functional equivalents.

EXEMPLARY ASPECTS OF THE DISCLOSURE

Implementation examples are described in the following numbered aspects:

Aspect 1. A method of wireless communication performed by a user equipment (UE), the method comprising: receiving a cell configuration associated with a cross-link interference sounding reference signal (CLI-SRS) timing; and transmitting, based on the CLI-SRS timing and a CLI-SRS priority configuration, a first communication at a first time period, wherein a second communication is scheduled for at least a portion of the first time period, and wherein one of the first communication or the second communication comprises a CLI-SRS.

Aspect 2. The method of aspect 1, wherein: the first communication is scheduled on a first frequency resource; the second communication is scheduled on a second frequency resource that at least partially overlaps with the first frequency resource; and the method further comprises: refraining, based on the CLI-SRS priority configuration, from transmitting the second communication at the first time period.

Aspect 3. The method of aspect 2, wherein: the first communication comprises the CLI-SRS; the second communication comprises at least one of a physical uplink control channel (PUCCH) transmission, a physical uplink shared channel (PUSCH) transmission, a physical sidelink control channel (PSCCH) transmission, a physical sidelink shared channel (PSSCH) transmission, or a non-CLI SRS; the CLI-SRS is associated with a higher priority than the second communication; and the refraining from transmitting the second communication is based on the CLI-SRS being associated with the higher priority than the second communication.

Aspect 4. The method of aspect 2, wherein: the first communication comprises at least one of a physical uplink control channel (PUCCH) transmission, a physical uplink shared channel (PUSCH) transmission, a physical sidelink control channel (PSCCH) transmission, a physical sidelink shared channel (PSSCH) transmission, or a non-CLI SRS; the second communication comprises the CLI-SRS; the CLI-SRS is associated with a lower priority than the first communication; and the refraining from transmitting the second communication comprises refraining from transmitting the CLI-SRS based on the CLI-SRS being associated with the lower priority than the first communication.

Aspect 5. The method of aspect 1, wherein: the first communication is scheduled on a first frequency resource; the second communication is scheduled on a second frequency resource that at least partially overlaps with the first frequency resource; the second communication is scheduled for a second time period overlapping with the first time period by at least one overlapping symbol; the method further comprises: dropping, based on the CLI-SRS priority configuration, a portion of the second communication associated with the at least one overlapping symbol.

Aspect 6. The method of any of aspects 1 or 5, wherein: the CLI-SRS priority configuration includes a CLI-SRS power allocation priority configuration; the transmitting the first communication comprises transmitting the first communication on a first component carrier (CC) based on the CLI-SRS power allocation priority configuration; and the method further comprises: transmitting, on a second CC based on the CLI-SRS power allocation priority configuration and simultaneously with the first communication at the first time, the second communication.

Aspect 7. The method of aspect 6, wherein: the first communication comprises at least one of a physical uplink control channel (PUCCH) transmission, a physical uplink shared channel (PUSCH) transmission, a physical sidelink control channel (PSCCH) transmission, a physical sidelink shared channel (PSSCH) transmission, or a non-CLI SRS; the second communication comprises the CLI-SRS; and the CLI-SRS is associated with a lower power allocation priority than the first communication.

Aspect 8. The method of any of aspects 1-7, wherein: the cell configuration is associated with a component carrier (CC), the CC including a Uu bandwidth part (BWP); the CLI-SRS configuration is associated with the Uu BWP and a sidelink (SL) BWP; and the transmitting the first communication comprises transmitting a first UL communication on the Uu BWP.

Aspect 9. The method of aspect 8, wherein: the Uu BWP is associated with a first subcarrier spacing (SCS) and the SL BWP is associated with a second SCS different from the first SCS; the transmitting the first UL communication comprises transmitting the CLI-SRS based the first SCS; and the method further comprises: transmitting, after a gap duration following the transmission of the first UL communication, a SL communication on the SL BWP based on the second SCS.

Aspect 10. The method of aspect 8, wherein: the first UL communication comprises the CLI-SRS scheduled for transmission on the Uu BWP; the second communication comprises a second UL communication scheduled for transmission on the Uu BWP; and the transmitting the CLI-SRS is based on a first Uu priority of the CLI-SRS relative to a second Uu priority associated with the second UL communication.

Aspect 11. The method of aspect 8, wherein: the first UL communication comprises the CLI-SRS scheduled for transmission on the Uu BWP; the second communication comprises a first SL communication scheduled for transmission on the SL BWP; and the transmitting the CLI-SRS is based on a first SL priority associated with the CLI-SRS relative to a second SL priority associated with the first SL communication.

Aspect 12. The method of aspect 8, wherein: the first UL communication comprises the CLI-SRS scheduled for transmission on the Uu BWP; the second communication comprises a first SL communication scheduled for transmission on the SL BWP; and the transmitting the CLI-SRS is based on a first Uu priority associated with the CLI-SRS relative to a first SL priority associated with the first SL communication.

Aspect 13. The method of aspect 8, wherein: the CLI-SRS priority configuration includes a CLI-SRS power allocation priority configuration; the first UL communication comprises the CLI-SRS, the CLI-SRS scheduled for transmission on the Uu BWP; the second communication comprises a SL communication scheduled for transmission on the SL BWP; the transmitting the first UL communication comprises transmitting, on the Uu BWP based on the CLI-SRS power allocation priority configuration and a Uu priority associated with the CLI-SRS the CLI-SRS; and the method further comprises: transmitting, on the SL BWP based on the CLI-SRS power allocation priority configuration and simultaneously with the CLI-SRS in the first time period, the SL communication.

Aspect 14. A user equipment (UE), comprising: a processor; and a transceiver in communication with the processor, wherein the UE is configured to perform the actions of any of aspects 1-13.

Aspect 15. A non-transitory, computer-readable medium having program code recorded thereon, wherein the program code comprises instructions executable by a processor of a user equipment (UE) to cause the UE to perform the actions of any of aspects 1-13.

Aspect 16. A user equipment (UE), comprising means for performing the actions of any of aspects 1-13.

Aspect 27. A method of wireless communication performed at a network device, the method comprising: transmitting a cell configuration associated with a cross-link interference sounding reference signal (CLI-SRS) timing; and receiving, based on the CLI-SRS timing and a CLI-SRS priority configuration, a first communication at a first time period, wherein a second communication is scheduled for at least a portion of the first time period, and wherein one of the first communication or the second communication comprises a CLI-SRS.

Aspect 28. A network device, comprising: a processor; and a transceiver in communication with the processor, wherein the network device is configured to: transmit a cell configuration associated with a cross-link interference sounding reference signal (CLI-SRS) timing; and receive, based on the CLI-SRS timing and a CLI-SRS priority configuration, a first communication at a first time period, wherein a second communication is scheduled for at least a portion of the first time period, and wherein one of the first communication or the second communication comprises a CLI-SRS.

What is claimed is:

1. A method of wireless communication performed at a user equipment (UE), the method comprising:
   receiving a cell configuration for cross-link interference sounding reference signal (CLI-SRS) timing, wherein the cell configuration for the CLI-SRS timing comprises a set of time resources for transmitting one or more CLI-SRSs, and wherein the cell configuration is associated with a component carrier (CC), the CC including a Uu bandwidth part (BWP); and
   transmitting, based on the CLI-SRS timing and a CLI-SRS priority configuration, a first uplink (UL) communication at a first time period on the Uu BWP, wherein the CLI-SRS priority configuration is associated with the Uu BWP and a sidelink (SL) BWP, wherein a second communication is scheduled for at least a portion of the first time period, and wherein one of the first UL communication or the second communication comprises a CLI-SRS of the one or more CLI-SRSs.

2. The method of claim 1, wherein:
   the first UL communication is scheduled on a first frequency resource;
   the second communication is scheduled on a second frequency resource that at least partially overlaps with the first frequency resource; and
   the method further comprises:
   refraining, based on the CLI-SRS priority configuration, from transmitting the second communication at the first time period.

3. The method of claim 2, wherein:
   the first UL communication comprises the CLI-SRS;
   the second communication comprises at least one of a physical uplink control channel (PUCCH) transmission, a physical uplink shared channel (PUSCH) transmission, a physical sidelink control channel (PSCCH) transmission, a physical sidelink shared channel (PSSCH) transmission, or a non-CLI SRS;
   the CLI-SRS is associated with a higher priority than the second communication; and
   the refraining from transmitting the second communication is based on the CLI-SRS being associated with the higher priority than the second communication.

4. The method of claim 2, wherein:
   the first UL communication comprises at least one of a physical uplink control channel (PUCCH) transmission, a physical uplink shared channel (PUSCH) transmission, or a non-CLI SRS;
the second communication comprises the CLI-SRS;
the CLI-SRS is associated with a lower priority than the first UL communication; and
the refraining from transmitting the second communication comprises refraining from transmitting the CLI-SRS based on the CLI-SRS being associated with the lower priority than the first UL communication.

5. The method of claim 1, wherein:
the first UL communication is scheduled on a first frequency resource;
the second communication is scheduled on a second frequency resource that at least partially overlaps with the first frequency resource;
the second communication is scheduled for a second time period overlapping with the first time period by at least one overlapping symbol; and
the method further comprises:
dropping, based on the CLI-SRS priority configuration, a portion of the second communication associated with the at least one overlapping symbol.

6. The method of claim 1, wherein:
the CLI-SRS priority configuration includes a CLI-SRS power allocation priority configuration;
the transmitting the first UL communication comprises transmitting the first UL communication on a first component carrier (CC) based on the CLI-SRS power allocation priority configuration; and
the method further comprises:
transmitting, on a second CC based on the CLI-SRS power allocation priority configuration and simultaneously with the first UL communication at the first time, the second communication.

7. The method of claim 6, wherein:
the first UL communication comprises at least one of a physical uplink control channel (PUCCH) transmission, a physical uplink shared channel (PUSCH) transmission or a non-CLI SRS;
the second communication comprises the CLI-SRS; and
the CLI-SRS is associated with a lower power allocation priority than the first UL communication.

8. The method of claim 1, wherein:
the Uu BWP is associated with a first subcarrier spacing (SCS) and the SL BWP is associated with a second SCS different from the first SCS;
the transmitting the first UL communication comprises transmitting the CLI-SRS based the first SCS; and
the method further comprises:
transmitting, after a gap duration following the transmission of the first UL communication, a SL communication on the SL BWP based on the second SCS.

9. The method of claim 1, wherein:
the first UL communication comprises the CLI-SRS scheduled for transmission on the Uu BWP;
the second communication comprises a second UL communication scheduled for transmission on the Uu BWP; and
the transmitting the CLI-SRS is based on a first Uu priority of the CLI-SRS relative to a second Uu priority associated with the second UL communication.

10. The method of claim 1, wherein:
the first UL communication comprises the CLI-SRS scheduled for transmission on the Uu BWP;
the second communication comprises a first SL communication scheduled for transmission on the SL BWP; and
the transmitting the CLI-SRS is based on a first SL priority associated with the CLI-SRS relative to a second SL priority associated with the first SL communication.

11. The method of claim 1, wherein:
the first UL communication comprises the CLI-SRS scheduled for transmission on the Uu BWP;
the second communication comprises a first SL communication scheduled for transmission on the SL BWP; and
the transmitting the CLI-SRS is based on a first Uu priority associated with the CLI-SRS relative to a first SL priority associated with the first SL communication.

12. The method of claim 1, wherein:
the CLI-SRS priority configuration includes a CLI-SRS power allocation priority configuration;
the first UL communication comprises the CLI-SRS, the CLI-SRS scheduled for transmission on the Uu BWP;
the second communication comprises a SL communication scheduled for transmission on the SL BWP;
the transmitting the first UL communication comprises transmitting, on the Uu BWP based on the CLI-SRS power allocation priority configuration and a Uu priority associated with the CLI-SRS the CLI-SRS; and
the method further comprises:
transmitting, on the SL BWP based on the CLI-SRS power allocation priority configuration and simultaneously with the CLI-SRS in the first time period, the SL communication.

13. A user equipment (UE), comprising:
a processor; and
a transceiver in communication with the processor, wherein the UE is configured to:
receive a cell configuration for cross-link interference sounding reference signal (CLI-SRS) timing, wherein the cell configuration for the CLI-SRS timing comprises a set of time resources for transmitting one or more CLI-SRSs, and wherein the cell configuration is associated with a component carrier (CC), the CC including a Uu bandwidth part (BWP); and
transmit, based on the CLI-SRS timing and a CLI-SRS priority configuration, a first uplink (UL) communication at a first time period on the Uu BWP, wherein the CLI-SRS priority configuration is associated with the Uu BWP and a sidelink (SL) BWP, wherein a second communication is scheduled for at least a portion of the first time period, and wherein one of the first UL communication or the second communication comprises a CLI-SRS of the one or more CLI-SRSs.

14. The UE of claim 13, wherein:
the first UL communication is scheduled on a first frequency resource;
the second communication is scheduled on a second frequency resource that at least partially overlaps with the first frequency resource; and
the UE is further configured to:
refrain, based on the CLI-SRS priority configuration, from transmitting the second communication at the first time period.

15. The UE of claim 14, wherein:
the first UL communication comprises the CLI-SRS;
the second communication comprises at least one of a physical uplink control channel (PUCCH) transmission, a physical uplink shared channel (PUSCH) transmission, a physical sidelink control channel (PSCCH) transmission, a physical sidelink shared channel (PSSCH) transmission, or a non-CLI SRS;
the CLI-SRS is associated with a higher priority than the second communication; and
the UE is configured to refrain from transmitting the second communication based on the CLI-SRS being associated with the higher priority than the second communication.

16. The UE of claim 14, wherein:
the first UL communication comprises at least one of a physical uplink control channel (PUCCH) transmission, a physical uplink shared channel (PUSCH) transmission, or a non-CLI SRS;
the second communication comprises the CLI-SRS;
the CLI-SRS is associated with a lower priority than the first UL communication; and
the UE is configured to refrain from transmitting the CLI-SRS based on the CLI-SRS being associated with the lower priority than the first UL communication.

17. The UE of claim 13, wherein:
the first UL communication is scheduled on a first frequency resource;
the second communication is scheduled on a second frequency resource that at least partially overlaps with the first frequency resource;
the second communication is scheduled for a second time period overlapping with the first time period by at least one overlapping symbol; and
the UE is further configured to:
drop, based on the CLI-SRS priority configuration, a portion of the second communication associated with the at least one overlapping symbol.

18. The UE of claim 13, wherein:
the CLI-SRS priority configuration includes a CLI-SRS power allocation priority configuration;
the UE is configured to transmit the first UL communication on a first component carrier (CC) based on the CLI-SRS power allocation priority configuration; and
the UE is further configured to:
transmitting, on a second CC based on the CLI-SRS power allocation priority configuration and simultaneously with the first UL communication at the first time, the second communication.

19. The UE of claim 18, wherein:
the first UL communication comprises at least one of a physical uplink control channel (PUCCH) transmission, a physical uplink shared channel (PUSCH) transmission, or a non-CLI SRS;
the second communication comprises the CLI-SRS; and
the CLI-SRS is associated with a lower power allocation priority than the first UL communication.

20. The UE of claim 13, wherein:
the Uu BWP is associated with a first subcarrier spacing (SCS) and the SL BWP is associated with a second SCS different from the first SCS;
the UE configured to transmit the first UL communication comprises the UE configured to transmit the CLI-SRS based the first SCS; and
the UE is further configured to:
transmit, after a gap duration following the transmission of the first UL communication, a SL communication on the SL BWP based on the second SCS.

21. The UE of claim 13, wherein:
the first UL communication comprises the CLI-SRS scheduled for transmission on the Uu BWP;
the second communication comprises a second UL communication scheduled for transmission on the Uu BWP; and
the UE configured to transmit the CLI-SRS based on a first Uu priority of the CLI-SRS relative to a second Uu priority associated with the second UL communication.

22. The UE of claim 13, wherein:
the first UL communication comprises the CLI-SRS scheduled for transmission on the Uu BWP;
the second communication comprises a first SL communication scheduled for transmission on the SL BWP; and
the UE configured to transmit the CLI-SRS based on a first SL priority associated with the CLI-SRS relative to a second SL priority associated with the first SL communication.

23. The UE of claim 13, wherein:
the first UL communication comprises the CLI-SRS scheduled for transmission on the Uu BWP;
the second communication comprises a first SL communication scheduled for transmission on the SL BWP; and
the UE configured to transmit the CLI-SRS based on a first Uu priority associated with the CLI-SRS relative to a first SL priority associated with the first SL communication.

24. The UE of claim 13, wherein:
the CLI-SRS priority configuration includes a CLI-SRS power allocation priority configuration;
the first UL communication comprises the CLI-SRS, the CLI-SRS scheduled for transmission on the Uu BWP;
the second communication comprises a SL communication scheduled for transmission on the SL BWP;
the UE configured to transmit the first UL communication comprises the UE configured to transmit, on the Uu BWP based on the CLI-SRS power allocation priority configuration and a Uu priority associated with the CLI-SRS the CLI-SRS; and
the UE is further configured to:
transmitting, on the SL BWP based on the CLI-SRS power allocation priority configuration and simultaneously with the CLI-SRS in the first time period, the SL communication.

25. A method of wireless communication performed at a network device, the method comprising:
transmitting a cell configuration for cross-link interference sounding reference signal (CLI-SRS) timing, wherein the cell configuration for the CLI-SRS timing comprises a set of time resources for transmitting one or more CLI-SRSs, and wherein the cell configuration is associated with a component carrier (CC), the CC including a Uu bandwidth part (BWP); and
receiving, based on the CLI-SRS timing and a CLI-SRS priority configuration, a first uplink (UL) communication at a first time period on the Uu BWP, wherein the CLI-SRS priority configuration is associated with the Uu BWP and a sidelink (SL) BWP, wherein a second communication is scheduled for at least a portion of the first time period, and wherein one of the first UL communication or the second communication comprises a CLI-SRS of the one or more CLI-SRSs.

26. The method of claim 25, wherein:

the method further comprises transmitting a downlink (DL) communication indicating a grant for the first UL communication;

the first UL communication is scheduled on a first frequency resource;

the second communication comprises the CLI-SRS scheduled on a second frequency resource that at least partially overlaps with the first frequency resource; and the CLI-SRS priority configuration indicates that the CLI-SRS is associated with a lower priority than the first UL communication.

27. A network device, comprising:

a processor; and a transceiver in communication with the processor, wherein the network device is configured to:

transmit a cell configuration for cross-link interference sounding reference signal (CLI-SRS) timing, wherein the cell configuration for the CLI-SRS timing comprises a set of time resources for transmitting one or more CLI-SRSs, and wherein the cell configuration is associated with a component carrier (CC), the CC including a Uu bandwidth part (BWP); and receive, based on the CLI-SRS timing and a CLI-SRS priority configuration, a first uplink (UL) communication at a first time period on the Uu BWP, wherein the CLI-SRS priority configuration is associated with the Uu BWP and a sidelink (SL) BWP, wherein a second communication is scheduled for at least a portion of the first time period, and wherein one of the first UL communication or the second communication comprises a CLI-SRS of the one or more CLI-SRSs.

28. The network device of claim 27, wherein:

the network device is further configured to transmit a downlink (DL) communication indicating a grant for the first UL communication;

the first UL communication is scheduled on a first frequency resource;

the second communication comprises the CLI-SRS scheduled on a second frequency resource that at least partially overlaps with the first frequency resource; and the CLI-SRS priority configuration indicates that the CLI-SRS is associated with a lower priority than the first UL communication.

* * * * *